(12) United States Patent
Karczewicz et al.

(10) Patent No.: US 8,750,378 B2
(45) Date of Patent: Jun. 10, 2014

(54) OFFSET CALCULATION IN SWITCHED INTERPOLATION FILTERS

(75) Inventors: Marta Karczewicz, San Diego, CA (US); Giovanni Motta, San Diego, CA (US); Yan Ye, San Diego, CA (US); Peisong Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 724 days.

(21) Appl. No.: 12/509,235

(22) Filed: Jul. 24, 2009

(65) Prior Publication Data

US 2010/0074332 A1 Mar. 25, 2010

Related U.S. Application Data

(60) Provisional application No. 61/099,509, filed on Sep. 23, 2008.

(51) Int. Cl.
*H04N 7/50* (2006.01)
*H04N 7/26* (2006.01)
*H04N 7/36* (2006.01)

(52) U.S. Cl.
CPC ........... *H04N 7/50* (2013.01); *H04N 7/26244* (2013.01); *H04N 7/26271* (2013.01); *H04N 7/26808* (2013.01); *H04N 19/00739* (2013.01); *H04N 19/0063* (2013.01)
USPC .................................................. 375/240.12

(58) Field of Classification Search
USPC ........................................ 375/240.12, 240.16
See application file for complete search history.

(56) References Cited

U.S. PATENT DOCUMENTS

| 6,052,148 A * | 4/2000 | Morishita ................ 375/240.01 |
| 2004/0062307 A1* | 4/2004 | Hallapuro et al. ....... 375/240.13 |
| 2004/0258104 A1* | 12/2004 | Li ................................. 370/537 |

(Continued)

FOREIGN PATENT DOCUMENTS

| CN | 1875628 A | 12/2006 |
| CN | 1890983 A | 1/2007 |
| WO | 2008084378 A2 | 7/2008 |

OTHER PUBLICATIONS

Y. Vatis and J. Ostermann, "Comparison of Complexity Between Two-Dimensional Non-Separable Adaptive Interpolation Filter and Standard Wiener Filter," ITU-T SGI 6/Q.6 Doc. VCEG-AA11, Nice, France, Oct. 2005.

(Continued)

*Primary Examiner* — Tung Vo
*Assistant Examiner* — Obafemi Sosanya
(74) *Attorney, Agent, or Firm* — Brent A. Boyd

(57) ABSTRACT

This disclosure describes techniques for adding offset to predictive video blocks during video coding. In one example, a method of encoding a video block includes interpolating a first block of predictive values based on a first reference video unit within a first list of reference data, and a second block of predictive values based on a second reference video unit within a second list of reference data, calculating, for sub-integer pixel positions, a first offset value based on the first block and the current video block, and a second offset value based on the first offset value and the second block, determining a final block of offset values based on the first block of predictive values, the second block of predictive values, the first offset values, and the second offset values, and encoding the current video block based on the final block of offset values.

45 Claims, 8 Drawing Sheets

(56) References Cited

U.S. PATENT DOCUMENTS

| | | | |
|---|---|---|---|
| 2006/0176956 A1* | 8/2006 | Ducloux et al. | 375/240.13 |
| 2006/0198440 A1* | 9/2006 | Yin et al. | 375/240.12 |
| 2008/0069203 A1* | 3/2008 | Karczewicz et al. | 375/240.01 |
| 2008/0247467 A1* | 10/2008 | Rusanovskyy et al. | 375/240.16 |
| 2008/0298702 A1* | 12/2008 | Gunupudi et al. | 382/251 |

OTHER PUBLICATIONS

S. Wittmann, T. Wedi, "Separable Adaptive Interpolation Filter," ITU-T SG 16/Q.6 Doc. T05-SG16-C-0219, Geneva, Switzerland, Jun. 2007.

D. Rusanovskyy, K. Ugur, J. Lainema, "Adaptive Interpolation with Directional Filters," ITU-T SGI 6/Q.6 Doc. VCEG-AG21, Shenzhen, China.

J. Jung and G. Laroche, "Performance Evaluation of the KTA 1.2 Software,"ITU-T SG16/Q.6 VCEG, VCEG-AE09, Marrakech, Morocco, Jan. 2007.

Y. Ye and M. Karczewicz, "Video Coding Using Enhanced Adaptive Interpolation Filter," IDF, Apr. 2008.

Y. Ye and M. Karczewicz, "Prediction, Quantization, and Coding of Filter Coefficients in Enhanced Adaptive Interpolation Filter (E-AIF)," Apr. 2008.

Y. Vatis, B. Edler, D.T. Nguyen, J. Ostermann, "Two-dimensional non-separable Adaptive Wiener Interpolation Filter for H.264/AVC," ITU-T SGI 16/Q.6 Doc. VCEG-Z17, Busan, Korea, Apr. 16-22, 2005.

G. Motta, Y. Ye, M. Karczewicz, "Improved Filter Selection for B-Slices in E-AIF," ITU-T SGI 16/Q.6 Doc. VCEG-AI38, Berlin, Germany, Jul. 16-18, 2008.

M. Karczewicz, Y. Ye, P. Chen, "Switched Interpolation Filter with Offset," ITU-T SGI 16/Q.6 Doc. VCEG-A135, Berlin, Germany, Jul. 16-18, 2008.

U.S. Patent Application entitled "Offsets at Sub-Pixel Resolution", U.S. Appl. No. 12/420,235, filed Apr. 8, 2009.

U.S. Patent Application entitled "Offsets at Sub-Pixel Resolution", U.S. Appl. No. 12/420,280, filed Apr. 8, 2009.

U.S. Patent Application entitled "Digital Video Coding with Interpolation Filters and Offsets", U.S. Appl. No. 12/432,544, filed Apr. 29, 2009.

International Search Report and Written Opinion—PCT/US2009/057831, ISA/EPO—Oct. 24, 2011.

Nokia: "Fast Selection of Adaptive Interpolation Filter ", ITU-T SG16 Meeting; Jun. 26, 2007-Jul. 6, 2007; Geneva,, No. T05-SG16-C-0150, Jun. 15, 2007 (Jun. 15, 2007), XP030003832.

Panchal R et al: "Simulation results and comments on Cleaned up KTA2.0 software" 36. VCEG Meeting; Oct. 10, 2008-Oct. 10, 2008; San Diego, US; (Video Coding-Experts Group of ITU-T SG.16),, Oct. 7, 2008 (Oct. 7 2008), XP030003647 cited in the application the whole document.

Qualcomm Inc: "Enhanced Adaptive Interpolation Filter", ITU-T SG16 Meeting; Apr. 22, 2008-May 2, 2008; Geneva, No. COM16-C464-E, 14 April 1 2008 (Apr. 14, 2008), XP030003810.

Qualcomm: "Switched Interpolation Filter with Offset" ITU-T SG16/Q.6 DOC. T05-SG-C 463 -E, International Telecommunication Union, Geneva, CH, Apr. 14, 2008, pp. 1-4, XP007908845.

* cited by examiner

OFFSET CALCULATION IN SWITCHED INTERPOLATION FILTERS

This application claims the benefit of U.S. Provisional Application No. 61/099,509, filed on Sep. 23, 2008, the entire contents of which are incorporated herein by reference.

BACKGROUND

1. Field of the Invention

This disclosure relates to digital video coding and, more particularly, techniques in which offsets are applied to predictive data used in the video coding.

2. Relevant Background

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as those described in standards defined by MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the reference frame or other coded unit. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder may be able to reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation and extrapolation techniques have been developed in order to improve the level of compression that can be achieved in inter-coding. In this case, the predictive data generated during motion compensation, which is used to code a video block, may be interpolated or extrapolated from the pixels of video blocks of the video frame or other coded unit used in motion estimation. Interpolation or extrapolation is often performed to generate predictive half pixel values (half-pel) and predictive quarter pixel values (quarter-pel). Such interpolation or extrapolation often generates predictive blocks that are even more similar to the video blocks being coded than the actual video blocks of the predictive frame or other coded unit used in the video coding.

SUMMARY

This disclosure describes techniques performed by an encoder and a decoder in order to add offset to bi-directionally predictive video blocks during the motion compensation process of video coding. According to one aspect of this disclosure, the encoder may generate a plurality of offset values for each coded unit, and apply the offset values to predictive data that is used to code the video blocks of the coded unit. In particular, the encoder may define different offset values for integer pixel locations and different sub-integer pixel locations. The appropriate offset value may be applied to corresponding predictive data based on pixel location associated with that predictive data. The sub-integer pixel locations may correspond to interpolated or extrapolated data, which is interpolated or extrapolated based on the data at integer pixel locations. By accounting for different offsets at different pixel locations (integer and sub-integer pixel locations), the resultant offset bi-directionally predictive data may provide for better compression than the original predictive data. In this way, the techniques of this disclosure may improve video quality. For example, the addition of offset to predictive data may improve coding during illumination changes between frames of a video sequence, e.g., such as during flashes, a darkening sky, or other types of illumination changes between frames.

In one example, the disclosure provides a method for encoding a current video block. The method comprises interpolating, via an encoder, a first block of predictive values associated with a sub-integer pixel position based on a first reference video unit within a first list of reference data, and a second block of predictive values associated with the sub-integer pixel position based on a second reference video unit within a second list of reference data. The method further comprises calculating, via an encoder, for sub-integer pixel positions, a first offset value based on the first block of predictive values and the current video block, and a second offset value based on the first offset value and the second block of predictive values. The method further comprises determining via an encoder, a final block of offset values based on the first block of predictive values, the second block of predictive values, the first offset values, and the second offset values. The method further comprises encoding via an encoder, the current video block based on the final block of offset values.

In another example, the disclosure provides an apparatus that encodes video data. The apparatus comprises a video encoder that interpolates a first block of predictive values associated with a sub-integer pixel position based on a first reference video unit within a first list of reference data, and a second block of predictive values associated with the sub-integer pixel position based on a second reference video unit within a second list of reference data. The apparatus further comprises a video encoder that calculates, for sub-integer pixel positions, a first offset value based on the first block of predictive values and the current video block, and a second offset value based on the first offset value and the second block of predictive values. The apparatus further comprises a video encoder that determines a final block of offset values based on the first block of predictive values, the second block of predictive values, the first offset values, and the second offset values. The apparatus further comprises a video encoder that encodes the current video block based on the final block of offset values.

In yet another example, the disclosure provides a computer-readable medium comprising instructions encoded on the computer-readable medium that, upon execution, cause a processor within a video encoder to interpolate a first block of predictive values associated with a sub-integer pixel position based on a first reference video unit within a first list of reference data, and a second block of predictive values associated with the sub-integer pixel position based on a second reference video unit within a second list of reference data. The computer-readable medium further comprises instructions that cause a processor to calculate, for sub-integer pixel positions, a first offset value based on the first block of predictive values and the current video block, and a second offset value based on the first offset value and the second block of predictive values. The computer-readable medium further comprises instructions that cause a processor to determine a final block of offset values based on the first block of predictive values, the second block of predictive values, the first offset values, and the second offset values. The computer-readable medium further comprises instructions that cause a processor to encode the current video block based on the final block of offset values.

In yet another example, the disclosure provides an apparatus that encodes video data. The apparatus comprises means for interpolating a first block of predictive values associated with a sub-integer pixel position based on a first reference video unit within a first list of reference data, and a second block of predictive values associated with the sub-integer pixel position based on a second reference video unit within a second list of reference data. The apparatus further comprises means for calculating, for sub-integer pixel positions, a first offset value based on the first block of predictive values and the current video block, and a second offset value based on the first offset value and the second block of predictive values. The apparatus further comprises means for determining a final block of offset values based on the first block of predictive values, the second block of predictive values, the first offset values, and the second offset values. The apparatus further comprises means for encoding the current video block based on the final block of offset values.

In yet another example, the disclosure provides a video encoding method that comprises encoding, via an encoder, as a first pass, a current frame using sequence filters, without using offsets. If all reference frames with an id=0 are separated from the current frame by the same number of frames, then encoding, via an encoder, as a picture order content (POC) pass, the current frame using sequence filters, without using offsets, on POC weighted reference frames. If the rate-distortion characteristic of the POC pass defines a lower rate distortion cost value than the rate-distortion characteristic of the first pass, then using the POC weighted reference frames for encoding, and storing the rate-distortion characteristic of the POC pass as a variable. If the rate-distortion characteristic of the first pass defines a lower rate distortion cost value than the rate-distortion characteristic of the POC pass, then storing the rate-distortion characteristic of the first pass as the variable. If all reference frames with an id=0 are not separated from the current frame by the same number of frames, then storing the rate-distortion characteristic of the first pass as the variable. The method further comprises computing, via an encoder, frame filters and offsets on the current frame and encoding, via an encoder, as a second pass, the current frame using the frame filters and offsets computed. If the rate-distortion characteristic of the second pass defines a lower rate distortion cost value than the rate-distortion characteristic stored in the variable, then storing the rate-distortion characteristic of the second pass as the variable, and increasing a quantization step by one and encoding, as a third pass, the current frame using the frame filters and offsets computed. If the rate-distortion characteristic of the second pass does not define a lower rate distortion cost value than the rate-distortion characteristic stored in the variable, then increasing the quantization step by one and encoding, as the third pass, the current frame using the sequence filters, without using offsets. If the rate-distortion characteristic of the third pass defines a lower rate distortion cost value than the rate-distortion characteristic stored in the variable, then adding the encoding of the third pass to the bitstream. If the rate-distortion characteristic of the third pass does not define a lower rate distortion cost value than the rate-distortion characteristic stored in the variable, then adding the encoding of the variable to the bitstream. The method further comprises computing, via an encoder, sequence filters to encode the next frame.

In yet another example, the disclosure provides an apparatus that encodes video data, the apparatus comprising a video encoder that encodes, as a first pass, a current frame using sequence filters, without using offsets. If all reference frames with an id=0 are separated from the current frame by the same number of frames, then the video encoder encodes, as a picture order content (POC) pass, the current frame using sequence filters, without using offsets, on POC weighted reference frames. If the rate-distortion characteristic of the POC pass defines a lower rate distortion cost value than the rate-distortion characteristic of the first pass, then the video encoder uses the POC weighted reference frames to encode, and stores the rate-distortion characteristic of the POC pass as a variable. If the rate-distortion characteristic of the first pass defines a lower rate distortion cost value than the rate-distortion characteristic of the POC pass, then the video encoder stores the rate-distortion characteristic of the first pass as the variable. If all reference frames with an id=0 are not separated from the current frame by the same number of frames, then the video encoder stores the rate-distortion characteristic of the first pass as the variable. The video encoder computes frame filters and offsets on the current frame, and the video encoder encodes, as a second pass, the current frame using the frame filters and offsets computed. If the rate-distortion characteristic of the second pass defines a lower rate distortion cost value than the rate-distortion characteristic stored in the variable, then the video encoder stores the rate-distortion characteristic of the second pass as the variable, and the video encoder increases a quantization step by one and encodes, as a third pass, the current frame using the frame filters and offsets computed. If the rate-distortion characteristic of the second pass does not define a lower rate distortion cost value than the rate-distortion characteristic stored in the variable, then the video encoder increases the quantization step by one and encodes, as the third pass, the current frame using the sequence filters, without using offsets. If the rate-distortion characteristic of the third pass defines a lower rate distortion cost value than the rate-distortion characteristic stored in the variable, then the video encoder adds the encoding of the third pass to the bitstream. If the rate-distortion characteristic of the third pass does not define a lower rate distortion cost value than the rate-distortion characteristic stored in the variable, then the video encoder adds the encoding of the variable to the bitstream. The video encoder computes sequence filters to encode the next frame.

In yet another example, the disclosure provides a computer-readable medium comprising instructions encoded on the computer-readable medium that, upon execution, cause a processor within a video encoder to encode, as a first pass, a current frame using sequence filters, without using offsets. If all reference frames with an id=0 are separated from the current frame by the same number of frames, then the instructions cause the processor to encode, as a picture order content (POC) pass, the current frame using sequence filters, without using offsets, on POC weighted reference frames. If the rate-distortion characteristic of the POC pass defines a lower rate distortion cost value than the rate-distortion characteristic of the first pass, then the instructions cause the processor to use the POC weighted reference frames to encode, and the instructions cause the processor to store the rate-distortion characteristic of the POC pass as a variable. If the rate-distortion characteristic of the first pass defines a lower rate distortion cost value than the rate-distortion characteristic of the POC pass, then the instructions cause the processor to store the rate-distortion characteristic of the first pass as the variable. If all reference frames with an id=0 are not separated from the current frame by the same number of frames, then the instructions cause the processor to store the rate-distortion characteristic of the first pass as the variable. The instructions cause the processor to compute frame filters and offsets on the current frame, and the instructions cause the processor to encode, as a second pass, the current frame using the frame filters and offsets computed. If the rate-distortion characteristic of the second pass defines a lower rate distortion cost value than the rate-distortion characteristic stored in the variable, then the instructions cause the processor to store the rate-distortion characteristic of the second pass as the variable, and the instructions cause the processor to increase a quantization step by one and encodes, as a third pass, the current frame using the frame filters and offsets computed. If the rate-distortion characteristic of the second pass does not define a lower rate distortion cost value than the rate-distortion characteristic stored in the variable, then the instructions cause the processor to increase the quantization step by one and encode, as the third pass, the current frame using the sequence filters, without using offsets. If the rate-distortion characteristic of the third pass defines a lower rate distortion cost value than the rate-distortion characteristic stored in the variable, then the instructions cause the processor to add the encoding of the third pass to the bitstream. If the rate-distortion characteristic of the third pass does not define a lower rate distortion cost value than the rate-distortion characteristic stored in the variable, then the instructions cause the processor to add the encoding of the variable to the bitstream. The instructions cause the processor to compute sequence filters to encode the next frame.

In yet another example, the disclosure provides an apparatus that encodes video data. The apparatus comprises means for encoding, via an encoder, as a first pass, a current frame using sequence filters, without using offsets. If all reference frames with an id=0 are separated from the current frame by the same number of frames, then the apparatus comprises means for encoding, via an encoder, as a picture order content (POC) pass, the current frame using sequence filters, without using offsets, on POC weighted reference frames. If the rate-distortion characteristic of the POC pass defines a lower rate distortion cost value than the rate-distortion characteristic of the first pass, then the apparatus comprises means for using the POC weighted reference frames for encoding, and means for storing the rate-distortion characteristic of the POC pass as a variable. If the rate-distortion characteristic of the first pass defines a lower rate distortion cost value than the rate-distortion characteristic of the POC pass, then the apparatus comprises means for storing the rate-distortion characteristic of the first pass as the variable. If all reference frames with an id=0 are not separated from the current frame by the same number of frames, then the apparatus comprises means for storing the rate-distortion characteristic of the first pass as the variable. The apparatus further comprises means for computing, via an encoder, frame filters and offsets on the current frame, and means for encoding, via an encoder, as a second pass, the current frame using the frame filters and offsets computed. If the rate-distortion characteristic of the second pass defines a lower rate distortion cost value than the rate-distortion characteristic stored in the variable, then the apparatus comprises means for storing the rate-distortion characteristic of the second pass as the variable. The apparatus further comprises means for increasing a quantization step by one and encoding, as a third pass, the current frame using the frame filters and offsets computed. If the rate-distortion characteristic of the second pass does not define a lower rate distortion cost value than the rate-distortion characteristic stored in the variable, then the apparatus comprises means for increasing the quantization step by one and encoding, as the third pass, the current frame using the sequence filters, without using offsets. If the rate-distortion characteristic of the third pass defines a lower rate distortion cost value than the rate-distortion characteristic stored in the variable, then the apparatus comprises means for adding the encoding of the third pass to the bitstream. If the rate-distortion characteristic of the third pass does not define a lower rate distortion cost value than the rate-distortion characteristic stored in the variable, then the apparatus comprises means for adding the encoding of the variable to the bitstream. The apparatus further comprises means for computing, via an encoder, sequence filters to encode the next frame.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
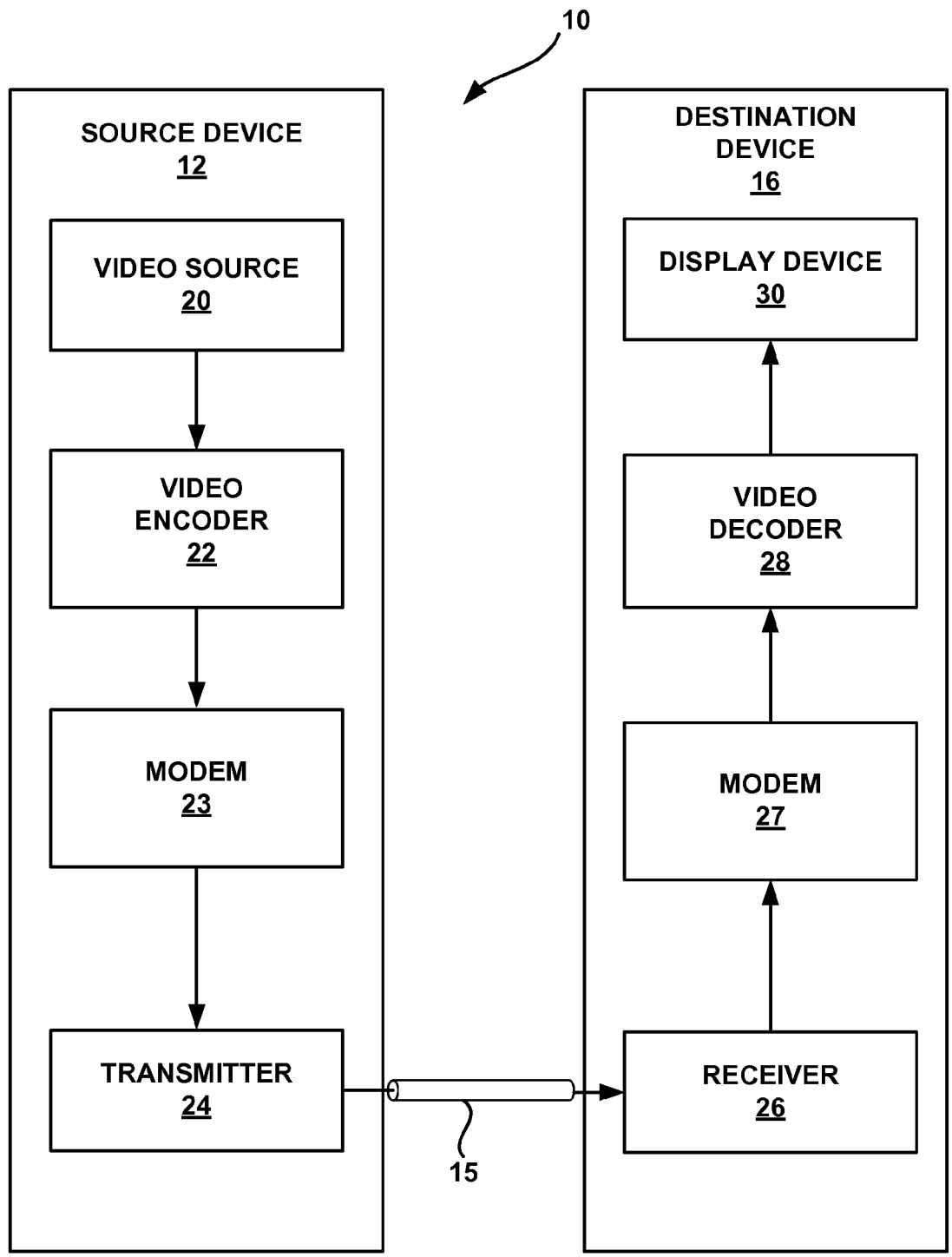
FIG. 1 is an exemplary block diagram illustrating a video encoding and decoding system.

This disclosure describes techniques performed by an encoder and a decoder in order to add offset to bi-directionally predictive video blocks during the motion compensation process of video coding. Bi-directionally predictive video blocks refer to predictive blocks used in the encoding or decoding of bi-directionally encoded blocks. Bi-directionally predictive video blocks are generated based on at least two different motion vectors that identify two different sets of predictive data. This disclosure provides techniques that introduce or otherwise add offset into bi-directionally predictive video blocks.

According to one aspect of this disclosure, the encoder may generate a plurality of offset values for each coded unit, and apply the offset values to predictive data that is used to code the video blocks of the coded unit. In particular, the encoder may define different offset values for integer pixel locations and different sub-integer pixel locations. The appropriate offset value may be applied to corresponding predictive data based on pixel location associated with that predictive data. The sub-integer pixel locations may correspond to interpolated or extrapolated data, which is interpolated or extrapolated based on the data at integer pixel locations. By accounting for different offsets at different pixel locations (integer and sub-integer pixel locations), the resultant offset bi-directionally predictive data may provide for better compression than the original predictive data. In this way, the techniques of this disclosure may improve video quality. For example, the addition of offset to predictive data may improve coding during illumination changes between frames of a video sequence, e.g., such as during flashes, a darkening sky, or other types of illumination changes between frames.

The ITU-T H.264 standard supports fractional interpolation of sub-integer pixels to quarter-pixel resolution. In this case, fifteen possible sub-integer pixel locations exist for every integer pixel location. For uni-directional inter mode prediction (P-mode), sixteen different offset values may be generated for each possible integer and sub-integer pixel location of the coded unit. As noted above, the coded unit may comprise a video frame, a slice of a video frame, or another independently decodable unit of video blocks. The offset values may include one offset value for integer pixel locations and several offset values for different sub-integer pixel locations. For example, consistent with the ITU-T H.264 standard which allows for fifteen different sub-integer locations for interpolated data, the offset values may likewise include fifteen different offset values for fifteen different sub-integer pixel locations.

According to techniques of this disclosure, for bi-directional inter mode prediction (B-mode), thirty-two different offset values may be generated for each possible integer and sub-integer pixel location of the coded unit. That is, sixteen different offset values may be generated for each possible integer and sub-integer pixel location based on a first reference frame, and sixteen different offset values may be generated for each possible integer and sub-integer pixel location based on a second reference frame. Thus, each possible integer and sub-integer pixel location has two offsets: a first offset based on the first reference frame, and a second offset based on the second reference frame. As will be described in more detail below, the two offsets are combined to form a single offset value. The single offset value may be applied to any predictive data based on pixel location associated with that predictive data. In particular, an offset value may be applied to adjust pixel values of a predictive video block, and the offset value that is used to make such pixel value adjustments may be dependent upon the location associated with that predictive video block (e.g., integer location or one of several possible sub-pixel locations). As noted below, the term "coded unit" refers to any independently decodable unit of a video frame such as an entire frame, a slice of a frame, or another independently decodable unit defined according to the coding techniques used. The techniques of this disclosure are applicable to all coded units.

The different offset values may be encoded as part of the bitstream for each coded unit. For example, for bi-directionally predicted coded units, thirty-two different offset values may be encoded as part of the bitstream. The decoder may receive the different offset values that were defined by the encoder for each coded unit. Accordingly, the decoder can generate predictive data and then reconstruct the offset predictive data based on the predictive data and the offset values. The decoder can decode the video data of the coded unit, e.g., the video blocks, based on the offset predictive data generated based on the predictive data and the offset values. As with the encoding, the addition of offset to the prediction data may improve video decoding by improving video quality during illumination changes or other video effects.

FIG. 1 is a block diagram illustrating one example of video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern the addition of offset to predictive data during motion compensation, are not necessarily limited to wireless applications or settings.

In the example of FIG. 1, source device 12 may include a video source 20, video encoder 22 a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to apply one or more of the offset techniques of this disclosure as part of a video encoding process. Similarly, video decoder 28 of destination device 16 may be configured to apply one or more of the offset techniques of this disclosure as part of a video decoding process.

The illustrated system 10 of FIG. 1 is merely one example of a video encoding and decoding system. The offset techniques of this disclosure may be performed by any encoding device that supports motion compensated interpolation to sub-pixel resolution. Source device 12 and destination device 16 are merely examples of such coding devices in which source device 12 generates coded video data for transmission to destination device 16. Devices 12, 16 may operate in a substantially symmetrical manner such that each of devices 12, 16 include video encoding and decoding components.

Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to add offset to predictive data during motion compensation. The video decoding process performed by video decoder 28 may also perform such techniques during its motion compensation stage of the decoding process. The information communicated over channel 15 may include offset information defined by video encoder 22, which is also used by video decoder 28. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, or another independently decodable unit defined according to the coding techniques used. The techniques of this disclosure are applicable to all coded units.

Following inter-based predictive coding (which includes interpolation and the techniques of this disclosure to define offset values for different integer and sub-integer pixel locations), and following any transforms (such as the 4×4 or 8×8 integer transform used in H.264/AVC or a discrete cosine transform DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

According to the techniques of this disclosure, video encoder 22 may calculate a plurality of offset values for a coded unit of the video data, such as a frame or an independently decodable portion of a frame such as a slice. The different offset values are associated with a plurality of different integer and sub-integer pixel locations associated with video blocks. The sub-integer pixel locations may define locations of interpolated or extrapolated data, which typically is interpolated or extrapolated based on the data at the integer pixel locations. Video encoder 22 may apply the offset values to predictive video blocks to generate offset predictive video blocks, and encode video blocks of the coded unit based on the offset predictive video blocks. Video encoder 22 may also encode the offset values as part of a coded bitstream that includes the coded video blocks of the coded unit, and transmitter 24 of source device 12 may transmit the coded bitstream to receiver 26 of destination device 16. In particular, video encoder 22 may apply offset values by adjusting pixels of bi-directionally predictive video blocks, and may encode video blocks based on the offset predictive video blocks by generating residuals based on the offset predictive video blocks. For example, residuals may be generated by subtracting a block to be coded from the appropriate offset predictive video block. Since offset is added to the pixel values of the offset predictive video block based on location of the predictive video block, coding efficiency may be improved, particularly during flashes or background lighting changes. In this case, the addition of offset may bias the pixel values of predictive blocks so that the offset predictive blocks more accurately match the blocks being coded, particularly when the differences between the blocks being coded and the predictive blocks (without offset) differ primarily by the same luminance intensity for all of the respective pixels.

In destination device 16, video decoder 28 receives the plurality of offset values for each coded unit of the video data. Video decoder 28 applies the offset values to predictive video blocks to generate offset predictive video blocks, and decodes video blocks of the coded unit based on the offset predictive video blocks. In this way, the offset values are defined and applied at video encoder 22 as part of the encoding process, and communicated from source device 12 to destination device 16 as part of an encoded bitstream. The offset values are then applied to predictive data at video decoder 28 as part of the decoding process in order to reconstruct the video sequence. In this case, offset to predictive data is created and used during video reconstruction.

Figure 2:
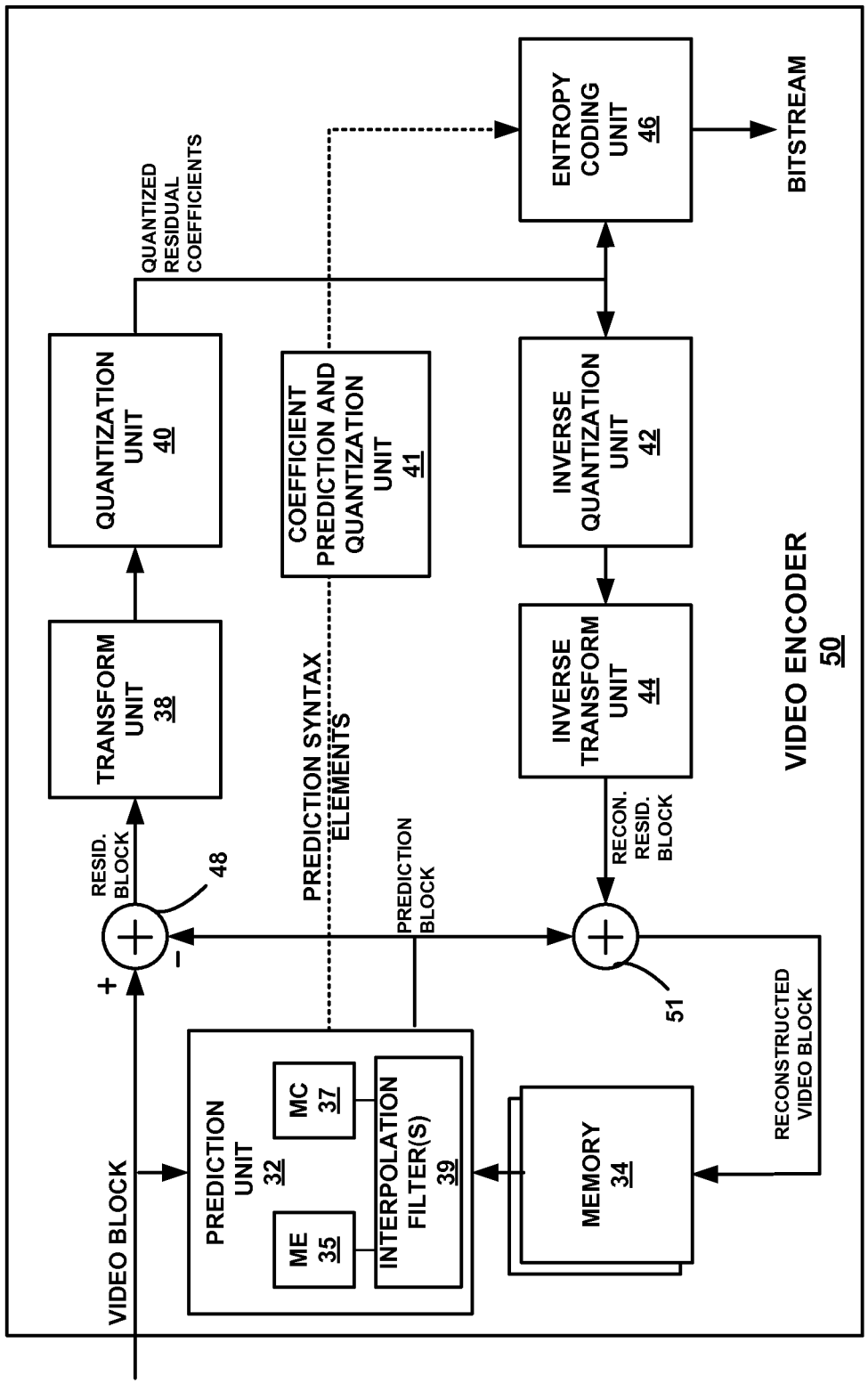
FIG. 2 is a block diagram illustrating an example of a video encoder consistent with this disclosure.

FIG. 2 is a block diagram illustrating an example of a video encoder 50 that may perform offset techniques as consistent with this disclosure. Video encoder 50 is one example of a specialized video computer device or apparatus referred to herein as a "coder." Video encoder 50 may correspond to video encoder 22 of source device 12, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode, and Inter-modes such as a prediction (P-mode) or a bi-directional (B-mode) may refer to the temporal based compression modes. Units encoded using B-mode are encoded with reference to two frames. In H.264, a B frame, or other unit, may be encoded with reference to two temporally prior frames. For example, if the current unit to be encoded resides within frame N, then frames N−1 and N−2 may be used as reference frames to encode the current unit. In other coding standards, for example MPEG-2, at least one temporally future frame (e.g., frame N+1) and at least one temporally prior frame (e.g., frame N−1) may be used to encode the current unit residing in frame N. The techniques of this disclosure apply during bi-directional inter-coding, and therefore, intra-coding units such as spatial prediction unit are not illustrated in FIG. 2 for simplicity and ease of illustration.

As shown in FIG. 2, video encoder 50 receives a video block within a video frame to be encoded. In the example of FIG. 2, video encoder 50 includes a prediction unit 32, memory 34, an adder 48, a transform unit 38, a quantization unit 40, and an entropy coding unit 46. For video block reconstruction, video encoder 50 also includes an inverse quantization unit 42, an inverse transform unit 44, and an adder 51. A deblocking filter (not shown) may also be included to filter block boundaries to remove blockiness artifacts from reconstructed video. If desired, the deblocking filter would typically filter the output of adder 51.

Prediction unit 32 may include a motion estimation (ME) unit 35, and a motion compensation (MC) unit 37. Filter 39 may be included in prediction unit 32 and may be invoked by one or both of ME unit 35 and MC unit 37 to perform interpolation or interpolation-like filtering as part of motion estimation and/or motion compensation, according to this disclosure. Filter 39 may actually represent a plurality of different filters to facilitate numerous different types of interpolation and interpolation-type filtering as described herein. Thus, prediction unit 32 may include a plurality of interpolation or interpolation-like filters. During the encoding process, video encoder 50 receives a video block to be coded (labeled "VIDEO BLOCK" in FIG. 2), and prediction unit 32 performs inter-prediction coding to generate a prediction block (labeled "PREDICTION BLOCK" in FIG. 2). Specifically, ME unit 35 may perform motion estimation to identify the prediction block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). In the case of bi-directional prediction, two motion vectors are generated: one motion vector indicating displacement of a prediction block within a first prediction or reference frame, and another motion vector indicating displacement of a prediction block within a second prediction or reference frame. In bi-directional prediction, the two reference frames (or portion of the two frames) may be temporally located prior to or after the video frame (or portion of the video frame) to which the current video block belongs. Motion compensation is typically considered the process of fetching or generating the prediction block from memory 34, or possibly interpolating or otherwise generating filtered predictive data based on the motion vector determined by motion estimation.

ME unit 35 selects the appropriate motion vectors for the video block to be coded by comparing the video block to video blocks of two reference frames (e.g., two previous frames, a previous frame and subsequent frame, or two subsequent frames). ME unit 35 may perform motion estimation with fractional pixel precision, sometimes referred to as fractional pixel, fractional pel, or sub-pixel motion estimation. As such, the terms fractional pixel, fractional pel, and sub-pixel motion estimation may be used interchangeably. In fractional pixel motion estimation, ME unit 35 may select a motion vector that indicates displacement to a location other than an integer pixel location. In this manner, fractional pixel motion estimation allows prediction unit 32 to track motion with higher precision than integer-pixel (or full-pixel) locations, thus generate a more accurate prediction block. Fractional pixel motion estimation may have half-pixel precision, quarter-pixel precision, eighth-pixel precision or any finer precision. ME unit 35 may invoke filter(s) 39 for any necessary interpolations during the motion estimation process.

To perform fractional pixel motion compensation, MC unit 37 may perform interpolation (sometimes referred to as interpolation filtering) in order to generate data at sub-pixel resolution (referred to herein as sub-pixel or fractional pixel values). MC unit 37 may invoke filter(s) 39 for this interpolation. Prediction unit 32 may perform the interpolation (or interpolation-like filtering of integer pixels) using the techniques described herein.

Once a first motion vector (based on a first reference frame) for the video block to be coded is selected by ME unit 35, MC unit 37 generates the prediction video block associated with that motion vector. MC unit 37 may fetch the prediction block from memory 34 based on the first motion vector determined by MC unit 37. In the case of a motion vector with fractional pixel precision, MC unit 37 filters data from memory 34 to interpolate such data to sub-pixel resolution, e.g., invoking filter(s) 39 for this process. In some cases, the interpolation filtering technique or mode that was used to generate the sub-pixel prediction data may be indicated as one or more interpolation syntax elements to entropy coding unit 46 for inclusion in the coded bitstream.

In bi-directional inter-coding, this process is repeated for the second motion vector based on the second reference frame. MC unit 37 generates the prediction video block associated with the second motion vector. MC unit 37 may fetch the prediction block from memory 34 based on the second motion vector determined by ME unit 35. In the case of a motion vector with fractional pixel precision, MC unit 37 filters data from memory 34 to interpolate such data to sub-pixel resolution, e.g., invoking filter(s) 39 for this process. In some cases, the interpolation filtering technique or mode that was used to generate the sub-pixel prediction data may be indicated as one or more interpolation syntax elements to entropy coding unit 46 for inclusion in the coded bitstream. Filter selection is described in greater detail below.

In bi-directional inter-coding, once prediction unit 32 has generated the two prediction blocks, video encoder 50 combines data from the two prediction blocks to produce a single prediction block. During their combination, each of the prediction blocks may be weighted differently. For example, if a coded unit of frame N uses a first prediction block from reference frame N−1 and a second prediction block from reference frame N−2, the first prediction block from reference frame N−1 may be weighted more heavily than the second prediction block from reference frame N−2 during the combination of the two prediction blocks in order to account for frame N−2 being more temporally removed from frame N than frame N−1.

As will be described in greater detail below, MC unit 37 may calculate DC offsets for each integer and sub-pixel position. The offset values may comprise absolute values or signed values that are used to bias all of the pixel values of a corresponding video block upward or downward, which again may be very useful for scene changes, flashes, lighting changes, or the like encountered in video encoding. The offset technique of this disclosure may apply with respect to luma blocks, chroma blocks, or both. Different offsets may be defined for each integer and sub-integer pixel location associated with each type of video block (e.g., luma and chroma blocks). Furthermore, different offsets could be assigned to each block at each particular size, partition or sub-partition of each block. The terms "offset" and "DC offset" are used interchangeably in this disclosure.

Once the offset values are defined, MC unit 37 may perform a second coding pass in order to code the video data based on the predictive data and the offsets. In particular, MC unit 37 may apply the offset values to original predictive video blocks to generate offset predictive video blocks, and encode video blocks of the coded unit based on the offset predictive video blocks. By adding offset to the pixel values of predictive blocks in a location-based manner according to pixel locations of the predictive blocks (integer location or one of a plurality of possible sub-integer pixel locations), the predictive blocks may be more similar to the blocks being coded, which can improve coding efficiency. Moreover, since offset values are defined differently for different pixel locations, the techniques of this disclosure may provide an ability to achieve segmentation among the coding of data associated with different types of interpolation.

Once MC unit 37 has generated offset prediction data (e.g., an offset predictive video block that may be interpolated data or integer-based data), video encoder 50 forms a residual video block (labeled "RESID. BLOCK" in FIG. 2) by subtracting the offset prediction block from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 16-bit value may be rounded down to a 15-bit value during quantization. In addition, quantization unit 40 may also quantize the different offsets using techniques of this disclosure to allocate a desired number of bits to respective integer and fractional portions of the different offsets. In particular, quantization unit 40 may, for each of the offset values, assign a first number of bits to an integer portion of a given offset value and assign a second number of bits to a fractional portion of the given offset value, wherein the first and second numbers of bits are determined based on a magnitude of the integer portion. Entropy coding unit 46 may encode the first number of bits differently than the second number of bits.

Following quantization, entropy coding unit 46 entropy codes the quantized transform coefficients. For example, entropy coding unit 46 may perform CAVLC, CABAC, or another entropy coding methodology. Entropy coding unit 46 may also code one or more prediction syntax elements obtained from prediction unit 32 or other component of video encoder 50. The one or more prediction syntax elements may include a coding mode, one or more motion vectors, an interpolation technique that was used to generate the sub-pixel data, a set or subset of filter coefficients, or other information associated with the generation of the prediction block. Coefficient prediction and quantization unit 41 may predictively encode and quantize the prediction syntax, such as filter coefficients. Following the entropy coding by entropy coding unit 46, the encoded video and syntax elements may be transmitted to another device or archived for later transmission or retrieval. The coded bitstream may include entropy coded residual blocks, motion vectors for such blocks, and other syntax including the offset values that identify the plurality of different offsets at different integer and sub-integer pixel locations within the coded unit.

Inverse quantization unit 42 and inverse transform unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform unit 38. The reconstructed residual block may differ from the residual block generated by adder 48 due to loss of detail caused by the quantization and inverse quantization operations. Summer 51 adds the reconstructed residual block to the motion compensated prediction block produced by prediction unit 32 to produce a reconstructed video block for storage in memory 34. The reconstructed video block may be used by prediction unit 32 as a reference block that may be used to subsequently code a block in a subsequent video frame or subsequent coded unit.

As described above, prediction unit 32 may perform motion estimation with fractional pixel (or sub-pixel) precision. When prediction unit 32 uses fractional pixel motion estimation, prediction unit 32 may generate data at sub-pixel resolution (e.g., sub-pixel or fractional pixel values) using interpolation operations described in this disclosure. In other words, the interpolation operations are used to compute values at positions between the integer pixel positions. Sub-pixel positions located half the distance between integer-pixel positions may be referred to as half-pixel (half-pel) positions, sub-pixel positions located half the distance between an integer-pixel position and a half-pixel position may be referred to as quarter-pixel (quarter-pel) positions, sub-pixel positions located half the distance between an integer-pixel position (or half-pixel position) and a quarter-pixel position are referred to as eighth-pixel (eighth-pel) positions, and the like.

Figure 3:
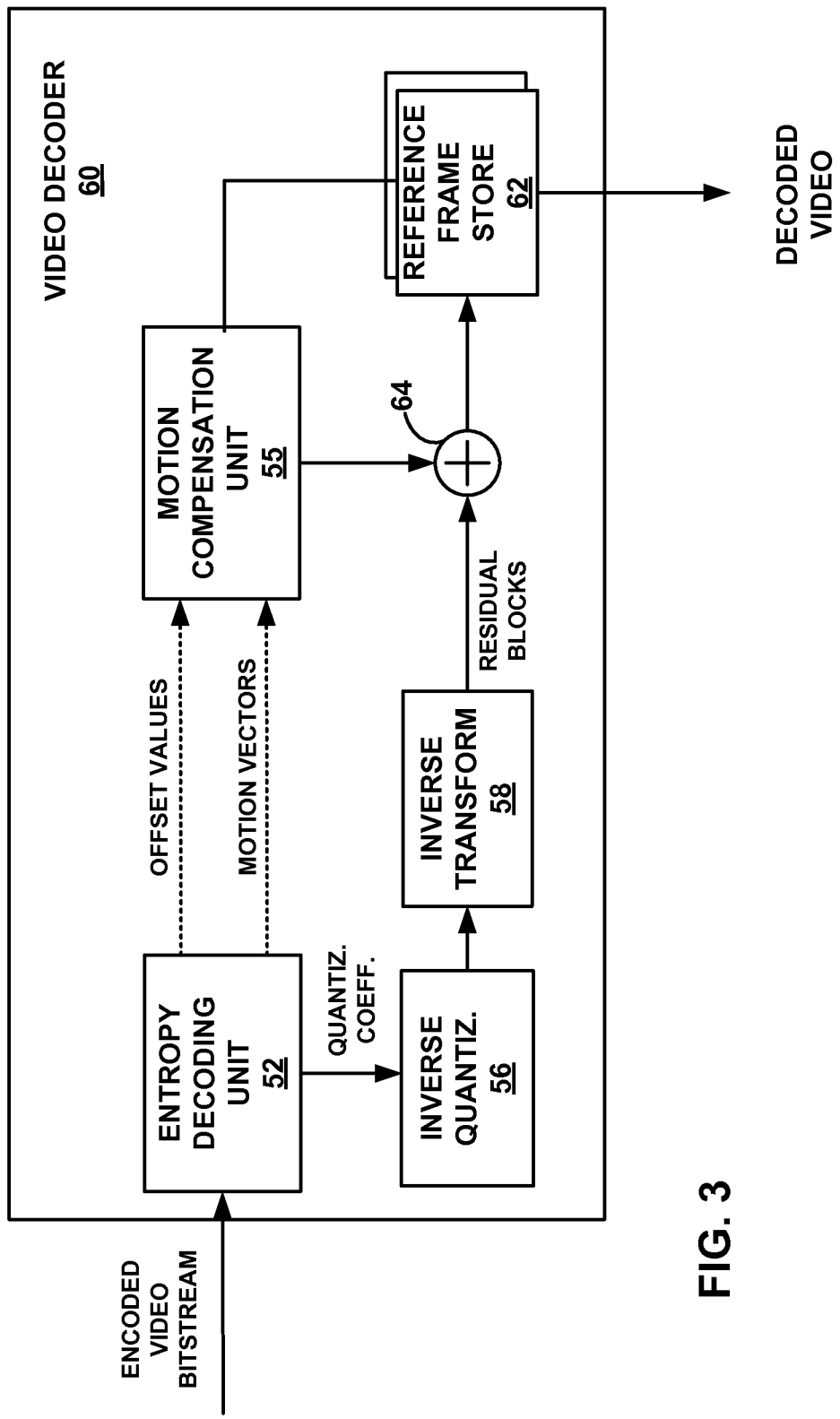
FIG. 3 is a block diagram illustrating an example of a video decoder consistent with this disclosure.

FIG. 3 is a block diagram illustrating an example of a video decoder 60, which decodes a video sequence that is encoded in the manner described herein. Video decoder 60 includes a motion compensation unit 55 that performs the offset techniques of this disclosure during the decoding. In particular, on the decoding side, motion compensation unit 55 may receive a syntax element from entropy decoding unit 52 that identifies a plurality of offset values for the coded unit, e.g., defining different offsets for integer pixel locations and one or more non-integer pixel locations. Motion compensation unit 55 may generate prediction data based on motion vectors received from entropy decoding unit 52 and may add the appropriate offset to such prediction data (based on pixel location of the prediction data) to generate offset prediction data. The prediction data may be interpolated data, in which case a corresponding one of the offset values for a non-integer location may be applied to the prediction data to generate the offset prediction data. Based on this offset prediction data, the video data (e.g., a reconstructed residual video block) can be decoded. In particular, decoder 60 may combine the offset prediction data with the residual video block to generate the originally video block that was encoded.

Entropy decoding unit 52 entropy decodes the received bitstream to generate quantized coefficients (labeled "QUANTIZ. COEFF." in FIG. 3) and the syntax (e.g., motion vectors and a plurality of offset values for the coded unit, labeled "OFFSET VALUES" and "MOTION VECTORS" in FIG. 3). The syntax is forwarded from entropy coding unit 52 to motion compensation unit 55. Inverse quantization unit 56 inverse quantizes, i.e., de-quantizes, the quantized block coefficients. The inverse quantization process may be a conventional process as defined by H.264 decoding. Inverse transform unit 58 applies an inverse transform, e.g., an inverse DCT or conceptually similar inverse transform process, to the transform coefficients in order to produce residual blocks in the pixel domain. Motion compensation unit 55 produces motion compensated blocks, possibly performing interpolation based on one or more sets of interpolation filter coefficients, which may also be included in the syntax. Once motion compensation unit 55 generates the predictive blocks based on the motion vectors, the appropriate offset for each predictive block can be added to the predictive blocks to generate the offset predictive blocks that were used in the original encoding performed by the encoder.

Summer 64 decodes residual blocks by summing the residual blocks with the corresponding offset prediction blocks generated by motion compensation unit 55 to form decoded blocks. If desired, a deblocking filter may also be applied to filter the decoded blocks in order to remove blockiness artifacts. The decoded video blocks are then stored in reference frame store 62, which provides reference blocks for subsequent motion compensation and also produces decoded video to a drive display device (such as device 28 of FIG. 1).

Again, the techniques of this disclosure concern the application of offset to motion compensated bi-directionally predictive data, in which the different offsets are used for integer and different sub-integer pixel locations defined by interpolation. The encoder uses the techniques of this disclosure to define and apply the different offset values, and the decoder interprets syntax elements sent from the encoder in order to identify that same offset value defined and used by the encoder. The appropriate offset is applied to pixel values of predictive data, and the appropriate offset is selected based on the pixel location defined for such predictive data, e.g., an integer pixel location or one of several possible non-integer pixel locations.

Figure 4:
FIG. 4 is a conceptual diagram illustrating integer pixels and various sub-integer pixels that may comprise pixels of predictive video blocks.
Figure 4:
Figure 4:
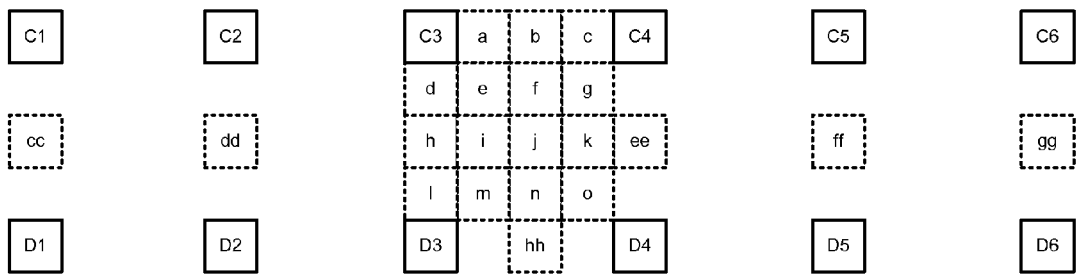
Figure 4:
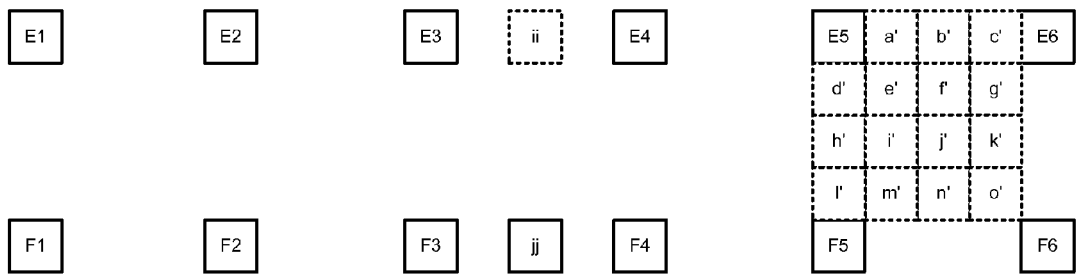

FIG. 4 is a conceptual diagram illustrating integer pixel (or full pixel) positions associated with prediction data, and sub-pixel (or fractional-pixel) positions associated with interpolated prediction data. In the conceptual illustration of FIG. 4, the different boxes represent pixel and sub-pixel locations or positions within a frame or a block of a frame. Capitalized letters (in the boxes with solid lines) represent integer-pixel locations, while small letters (in the boxes with dotted lines) represent the sub-pixel locations. In particular, pixel locations A1-A6, B1-B6, C1-C6, D1-D6, E1-E6 and F1-F6 represent a 6-by-6 array of integer pixel locations within a frame, slice or other coded unit. Sub-pixel locations "a" through "o" represent fifteen sub-pixel locations associated with integer pixel C3, e.g., between integer pixel locations C3, C4, D3 and D4. Sub-pixel locations "a" through "o" represent fifteen sub-pixel locations associated with integer pixel C3, e.g., between integer pixel locations C3, C4, D3 and D4. The sub-pixel locations "a" through "o" represent every half-pel and quarter-pel pixel location associated with integer pixel C3. Similarly, sub-pixel locations "a'" through "o'" represent fifteen sub-pixel locations associated with integer pixel E5, e.g., between integer pixel locations E5, E6, F5, and F6. Similar sub-pixel locations may exist for every integer pixel location. Most of the other fractional locations are not shown for simplicity (other than those mentioned above, which are used to generate one or more of the 15 different fractional locations associated with pixel "C3").

Integer-pixel locations may be associated with a physical sensor element, such as a photodiode when the video data was originally generated. The photodiode may measure an intensity of a light source at the location of the sensor and associate a pixel intensity value with the integer-pixel location. Again, each integer-pixel location may have an associated set of fifteen sub-pixel locations (or possibly more). The number of sub-pixel locations associated with integer-pixel locations may be dependent upon the desired precision. In the example illustrated in FIG. 4, the desired precision is quarter-pixel precision, in which case, each of the integer pixel locations corresponds with fifteen different sub-pixel positions. More or fewer sub-pixel positions may be associated with each integer-pixel location based on the desired precision. For half-pixel precision, for example, each integer-pixel location may correspond with three sub-pixel positions. As another example, each of the integer-pixel locations may correspond with sixty-three sub-pixel positions for eighth-pixel precision. Each pixel location may define one or more pixel values, e.g., one or more luminance and chrominance values.

Y may represent luminance, and Cb and Cr may represent two different values of chrominance of a three-dimensional YCbCr color space. Each pixel location may actually define three pixel values for a three-dimensional color space. The techniques of this disclosure, however, may refer to prediction with respect to one dimension for purposes of simplicity. To the extent that techniques are described with respect to pixel values in one dimension, similar techniques may be extended to the other dimensions.

Each pixel may correspond to an upper right-hand pixel of a video block such that that pixel defines the video block. For interpolation or extrapolation, each of the pixels of a video block may be interpolated or extrapolated the same way with respect to different integer pixels that have the same spatial distance from the respective sub-integer pixels.

In the ITU H.264/AVC standard, for example, in order to obtain luma signals at half-pixel positions, a 6-tap Wiener filter with coefficients [1, −5, 20, 20, −5, 1] is typically used. Then, in order to obtain luma signals at quarter-pixel locations, a bilinear filter is used. The bilinear filter may also be used in fractional pixel interpolation for the chroma components, which may have up to ⅛-pixel precision in H.264/AVC.

Consistent with the ITU-T H.264 standard, for example, prediction unit 32 may determine pixel values for half-pixel locations using a 6-tap interpolation filter, such as a Wiener filter. In the case of the H.264 standard, the filter coefficients for the 6-tap interpolation filter are typically [1, −5, 20, 20, −5, 1], although other coefficients may be used. Prediction unit 32 may apply the interpolation filter first in the horizontal direction and then in the vertical direction, or vice versa. For half-pixel positions "b" and "h," each tap may correspond to an integer pixel position in the horizontal and vertical direction, respectively. In particular, for half-pixel position "b," the taps of the 6-tap filter correspond to C1, C2, C3, C4, C5, and C6. Likewise, for half-pixel position "h," the taps of the 6-tap filter correspond to A3, B3, C3, D3, E3, and F3. For example, pixel values for sub-pixel positions "b" and "h" may be computed using equations (1) and (2):

$$b=((C1-5*C2+20*C3+20*C4-5*C5+C6)+16)/32 \quad (1)$$

$$h=((A3-5*B3+20*C3+20*D3-5*E3+F3)+16)/32 \quad (2)$$

For half-pixel position "j," the taps of the 6-tap filter correspond themselves to interpolated horizontally between positions C1-C6 and D1-D6, or vertically between positions A3-F3 and A4-F4. Half-pixel location "j" may be computed with a 6-tap filter that uses previously interpolated pixel values of the half-pixel positions, e.g., in accordance with one of equations (3) or (4):

$$j=((aa-5*bb+20*b+20*hh-5*ii+jj)+16)/32 \quad (3)$$

$$j=((cc-5*dd+20*h+20*ee-5*ff+gg)+16)/32 \quad (4)$$

where (as illustrated in FIG. 4) aa corresponds to an interpolation between A3 and A4, bb corresponds to an interpolation between B3 and B4, b corresponds to an interpolation between C3 and C4, hh corresponds to an interpolation between D3 and D4, ii corresponds to an interpolation between E3 and E4 and jj corresponds to an interpolation between F3 and F4. In equation 4, cc corresponds to an interpolation between C1 and D1, dd corresponds to an interpolation between C2 and D2, h corresponds to an interpolation between C3 and D3, ee corresponds to an interpolation between C4 and D4, ff corresponds to an interpolation between C5 and D5 and gg corresponds to an interpolation between C6 and D6.

Consistent with the H.264 standard, prediction unit 32 may determine pixel values at quarter-pixel locations "a," "c," "d," "e," "f," "g," "i," "k," "l," "m," "n" and "o" using a bilinear interpolation filter and the pixel values of the surrounding integer- and half-pixel locations. For example, prediction unit 32 may determine a pixel value associated with sub-pixel position "a" using pixel values of C3 and "b," determine a pixel value associated with sub-pixel position "c" using pixel values of "b" and C4, and the like.

FIG. 4 is a conceptual diagram of a first reference video unit within a first list of reference data. The techniques described above with respect to FIG. 4 result in a first block of predictive values associated with a sub-integer pixel position based on the first reference video unit within the first list of reference data. As described above, in bi-directional inter-coding, a second reference unit is also required to form a predictive video unit for a current block to be encoded. In a manner similar to that described above with respect to FIG. 4, a second reference video unit within a second list of reference data is used to generate a second block of predictive values associated with a sub-integer pixel position. The first and second lists may comprise different reference frames, different slices from different frames, different slices from the same reference frames, different portions of data of one or more previous or subsequent frames, or possibly different sets of data that each include data from one or more frames, slices or other coded units.

After motion estimation, the best motion vector for a given video block may be identified, e.g., using a rate-distortion model in order to balance the coding rate and video quality. The prediction video block is formed during motion compensation using the best motion vector for a given block. As described above, once prediction unit 32 has generated the two prediction blocks, video encoder 50 combines the two prediction blocks to produce a single prediction block. During their combination, each of the prediction blocks may be weighted differently. For example, if a coded unit of frame N uses a prediction block from reference frame N−1 and a prediction block from reference frame N−2, reference frame N−1 may be weighted more heavily than reference frame N−2 during the combination of the two prediction blocks in order to account for frame N−2 being more temporally removed from frame N than frame N−1. As outlined above, the residual video block is formed by subtracting the prediction video block from the original video block. A transform is then applied on the residual block, and the transform coefficients are quantized and entropy coded to further reduce bit rate.

The techniques of this disclosure include adding offset to the bi-directionally predictive video units. As will be described in more detail below, for each sub-pel position, a first offset value is calculated based on the first reference video unit within the first list of reference data. Then, for each sub-pel position, a second offset value is calculated based on the second reference video unit within the second list of reference data. The second offset value calculation, however, uses the first offset value previously calculated. Calculating the first and second offset values results in thirty-two offset values for quarter-pel precision: two offsets, i.e., a first offset and a second offset, per sub-pel and integer pixel position. In order to determine a final offset value for each position, the first offset value is combined with the first prediction of the position from the first prediction block, and the second offset is combined with the second prediction of the position from the second prediction block, and the result is divided by two, unless is weighting is used.

The value of the offset may be location-specific in that different offsets are defined for different integer and sub-integer pixel locations. The offset associated with video blocks identified by pixels "b" and "b'" may be the same since these two pixels define the same sub-integer pixel location with respect to integer pixels C3 and E5. However, the offset associated with video blocks identified by pixels "c" and "d'" may be different since pixels "c" and "d'" define different sub-integer pixel locations with respect to integer pixels C3 and E5. Each of the sixteen different pixel locations "C3," "a," "b," "c," "d," "e," "f," "g," "h," "i," "j," "k," "l," "m," "n," and "o" may define different offsets. Moreover, these different offsets may also apply respectively to each of the sixteen different pixel locations "E5," "a'," "b'," "c'," "d'," "e'," "f'," "g'," "h'," "i'," "j'," "k'," "l'," "m'," "n'," and "o'." The offsets may define a signed value that essentially biases every pixel value of the predictive block upward or downward to generate an offset predictive block. Again, biasing using offsets may be helpful in capturing illumination changes between different frames of a video sequence.

The offsets may be referred to as DC offsets, since they comprise a difference between the mean of all pixels of the coded unit that have the same sample location (integer or particular sub-integer location) relative to the mean of all corresponding predictive pixels. That is, because each of the pixels of a block are biased in the same way and by the same degree, the offset results in a change of the DC value of the transformed data resulting from, e.g., a DCT calculation, where the DC value is the upper-left value of the matrix resulting from the transform calculation. This is because the DC value represents an average of the pixel values of a block. Therefore, by biasing the pixels by a particular value, the DC value resulting from the transform calculation will be biased in a similar way. Accordingly, in some examples, the DC offset may be applied to the DC value resulting from the transform calculation, rather than applying the DC offset to each pixel of the block.

In some examples, each of the integer and sub-integer pixel location may be assigned a different offset value. The offset value corresponding to the pixel or sub-pixel referenced by the motion vector is applied to each pixel of a block. By way of specific example, for the pixel locations "e," "f," "g," "i," "k," "m," "n," and "o," the offset values {1, 6, 4, 5, 7, 3, 8, 2} may be respectively assigned, to assign offset values ranging between 1 and 8 to the pixel and sub-pixel locations. That is, the offset value mapping may be {C3->null, a->null, b->null, c->null, d->null, e->1, f->6, g->4, h->null, i->5, j->null, k->7, l->null, m->3, n->8, o->2}.

In another example, the offset value may comprise a difference between the average value of pixels of a reference frame and the average value of pixels of a current frame. Referring to such a difference as DCframe, in one example, when 0<DCframe<1.5, offsets with a magnitude of 1 are assigned to 10*DCframe (rounded to the nearest integer) pixel positions. For example, where DCframe equals 0.83, eight of the sixteen pixel locations are assigned an offset with a magnitude of 1.

As another example, let DCmb represent the difference between the average value of the pixels of a reference block and the average value of the pixels of the current block. Further, let DCmin be the smallest value of DCmb assigned to at least a threshold number of macroblocks, and let DCmax be the largest value of DCmb assigned to at least the threshold number of macroblocks. In one example, when DCframe>1.5, each of the pixel values is assigned an offset value ranging between DCmin and DCmax.

Again, FIG. 4 shows the integer-pixel samples (also called full-pixels) in the solid boxes with upper-case letters. For any given integer-pixel sample, there may be 15 sub-pixel positions, which are shown for integer-pixel sample "C3" and labeled "a" through "o" in FIG. 4. In accordance with H.264/AVC, MC unit 37 may calculate the half-pixel positions "b," "h," and "j" first using a one-dimensional 6-tap Wiener filter. The interpolation filter may be applied first in the horizontal direction and then in the vertical direction, or vice versa. MC unit 37 may then filter the remaining quarter-pixel positions using the bilinear filter and the already calculated half-pixel samples.

The actual filters applied to generate interpolated data may be subject to a wide variety of implementations. As one example, several sets of fixed, predetermined interpolation filters may be applied and the set that yields the best predictive data may be selected. In some examples, interpolation filters may be selected based on historical interpolation data for one or more reference frames, as described in this disclosure. The addition of offset, per this disclosure, occurs after generating any interpolated predictive data from the reference frame to be used in the coding, but before motion estimation is performed for the current frame to be coded.

MC unit 37 may use a switched interpolation filter with offset (SIFO) scheme. MC unit 37 may choose between a plurality of fixed interpolation filters 39, e.g., which may be respectively defined by plurality of different pre-defined sets of interpolation filter coefficients. The choice of the interpolation filter may be performed for each coded unit level (e.g., frame level or slice level) or for each sub-pixel position (sample level). Furthermore, according to this disclosure, DC offsets may also be added after prediction, and the DC offsets may also be defined for each possible integer or fractional pixel location as described in this disclosure.

Thus, MC unit 37 may use different sets of fixed interpolation filters 39 in order to define several possible alternatives of interpolation data. As examples, MC unit 37 may use a standard ITU-T H.264 filter set, a filter set based on H.264/AVC but with higher precision (without intermediate rounding for ½-pixel positions and biased rounding for ¼-pixel positions) or a set of customized interpolation filters. The set of customized interpolation filters may be pre-defined by using a set of training video sequences.

The filter set that offers the best prediction (i.e., the smaller prediction error energy) may be chosen by MC unit 37. That is, a filter may be selected for each sub-pixel position in order to minimize the error between the motion compensated filtered references and the blocks being predicted. In one example, the error accumulated for the combination of sub-pixel positions from list 0, e.g., sub_pos[0], and sub-pixel positions from list 1, e.g., sub_pos[1], may be calculated according to the following pseudocode:

```
tmp = valOrg −
    clip1a(((wbp_weight[0][fw_ref_idx][bw_ref_idx][
    0] * predF[i] +
    wbp_weight[1][fw_ref_idx][bw_ref_idx][0] *
    predB[j] + (wp_offset[0][fw_ref_idx][0] +
    wp_offset[1][bw_ref_idx][0]) * 2 *
    wp_luma_round + 2 * wp_luma_round * (1 − img-
    >bipred_rounding)) >>
    (luma_log_weight_denom+1)));
    AccErrorB[i][j][sub_pos[0]][sub_pos[1]] += (tmp
    * tmp);
``` where the terms "predF[i]" and "predB[j]" are the forward and backward predictions corresponding to the filters i and j, the terms "wbp_weight[list][fw][bw][comp]" represent the weights used in the weighted prediction, the terms "wp_offset [list][ref][comp]" are the offsets in the weighted prediction, and the term "img->bipred_rounding" controls the rounding in a B-slice. When the weighted prediction is not used, the first statement simplifies to the following:

```
tmp = valOrg − ((predF[i] + predB[j] +1
    −img->bipred_rounding) >> 1);
```

By way of example, MC unit 37 selects a first filter "i," e.g., filter F1, from the set of fixed interpolation filters 39, and generates the sub-pixel prediction data for forward prediction, i.e., predF[F1]. MC unit 37 then selects a second filter "j," e.g., filter F2, from the set of fixed interpolation filters 39 and generates the sub-pixel prediction data for backward prediction, i.e., predB[F2]. In accordance with the technique represented by the pseudocode presented above, an accumulated error value AccErrorB[F1][F2][sub_pos[0]][sub_pos [1]] is calculated using the sub-pixel prediction data for forward prediction and the sub-pixel prediction data for backward prediction. MC unit 37 stores the accumulated error value for the combination of filters F1 and F2. Then, MC unit 37 selects another two filters from the set of fixed interpolation filters 39 to generate the sub-pixel prediction data for forward and backward prediction. As before, an accumulated error value is calculated and stored. MC unit 37 may continue this process of accumulating and storing error values for each combination of the set of fixed interpolation filters. In some examples, MC unit 37 may choose default filters, e.g., the standard ITU-T H.264 filter set, for each of the sub-pixel positions. In one example, MC unit 37 may continue the process for a predetermined number of combinations of filters if the accumulated error value of at least one combination is below a threshold error value. Once MC unit 37 calculates and stores the various accumulated error values for the set of fixed interpolation filters 39, MC unit 37 begins the process of selecting a filter for each sub-pixel position.

In one example, after accumulating the prediction errors for each combination of filters 39, MC unit 37 calculates a rate-distortion cost to encode the filter coefficient side information for each set of fixed interpolation filters 39. For example, MC unit 37 may use a cost function to in order to determine the cost to encode the filter coefficients for each set of fixed interpolation filters as a function of rate and distortion. In some examples, the cost in bits may be multiplied by a scaling factor. Once the cost for each set of filters has been calculated, the cost and the accumulated error value for each set of filters can be compared to one another and the set of filters that results in the lowest error and the lowest cost may be selected.

Once the filters are selected and the predictive data is generated or interpolated by MC unit 37, DC offset may be applied to the predictive data based on the sample location associated with the interpolated (or non-interpolated) data. In particular, this disclosure provides the use of different DC offsets for different integer or sub-integer pixel locations. Again, in the example data shown in FIG. 4, this means that each of the sixteen different pixel locations "C3," "a," "b," "c," "d," "e," "f," "g," "h," "i," "j," "k," "l," "m," "n," and "o" may define its own, different offset. Hence, for sixteen possible integer and sub-integer locations, there may be sixteen different offsets. Moreover, these different offsets may also apply respectively to each of the sixteen different pixel locations "E5," "a'," "b'," "c'," "d'," "e'," "f'," "g'," "h'," "i'," "j'," "k'," "l'," "m'," "n'," and "o'."

Adding DC offsets to the pixels of prediction data may help to capture effects of illumination changes between different video frames. Illumination changes may be caused by such things as flashes or a darkening sky in a video sequence. H.264/AVC uses weighted prediction, which may allow offsets to be added to the prediction pixel value. However, the DC offsets defined by H.264/AVC weighted prediction may only be allowed on a frame level, meaning that only one offset value is defined for a given frame regardless of whether prediction data of a video block is interpolated or not. In other words, for frame level offset, all pixels in the same frame have the same DC offset.

In accordance with this disclosure, in some cases, DC offset may be defined differently for different sample positions associated with interpolated and non-interpolated data. Thus, different DC offsets may be defined for each of the 15 sub-pixel positions shown in FIG. 4 ("a," "b," "c," "d," "e," "f," "g," "h," "i," "j," "k," "l," "m," "n," and "o") and another DC offset may be defined for integer-pixel positions. When sample-based DC offsets are used for quarter-pel precision, a total of 16 DC offsets may be coded and sent as syntax elements in the video bitstream for the decoder. By applying sample-based DC offsets, MC unit 37 may provide a simple but effective motion segmentation tool. As an example, a video frame may contain a darkening sky as still background and a moving object as the foreground. In this case, the background and the foreground may have different degrees of illumination changes, and by using location-specific DC offset values defined by the location of the pixel that identifies a given video block, motion compensation unit 37 may be able to capture the different degrees of illumination changes in the foreground and the background in a more efficient manner than could be achieved without such location-specific DC offset values.

As mentioned above, the techniques of this disclosure include adding offset to the bi-directionally predictive video blocks. Because bi-directionally predictive video blocks use two different reference video units from two different lists of reference data, two different DC offsets may be calculated for each integer and sub-integer location associated with the different reference frames. However, if a desirable first offset is calculated for each integer and sub-integer location based on the first reference video unit within the first list of reference data, and if a desirable second offset is calculated for each integer and sub-integer location based on the second reference video unit within the second list of reference data, the combination of the first and second desirable offsets will not necessarily result in a desirable offset. For example, the combination of the first and second offsets may result in an offset that is greater than a desirable offset. According to techniques of this disclosure, the two different offsets for each integer and sub-integer location may be calculated jointly in order to produce a desirable offset. First, the offsets are calculated for one list, e.g., list 0, and then the offsets for another list, e.g., list 1, are calculated by taking into account the previously determined offsets from the other list, e.g., list 0.

A set of first DC offsets may be calculated for the closest reference frame in the list 0. For each sub-pixel position sub_pos[0], the DC offset may be calculated as the difference between the mean of all pixels in the current frame that have motion vector precision corresponding to sub-pixel position sub_pos[0] and the mean of their bi-predicted interpolated values. The error used for the calculation of the sub-pixel offsets for the frame 0 in the list 0 is accumulated in "AccFrameOffsetF[ref_frame[0]]" as described in the following pseudocode:

```
tmp = valOrg - GetInterpolatedPixel(imgY, ycoord0,
    xcoord0,img->width, img->height,
        sub_pos[0], filterF);
    AccFrameOffsetF[ref_frame[0]] += tmp;
``` where "tmp" is the prediction error. The variable "filterF" stores the index of the filter that was selected to generate the sub-pixel prediction data for forward prediction. In this manner, the accumulated optimized offsets are calculated for a first list, e.g., list 0.

Once the offset calculated above, namely "AccFrameOffsetF[ref_frame[0]]," is applied to the interpolated pixels in the closest frame in the first list, e.g., list 0, the offsets are calculated for the closest reference frame in the other, or second, list, e.g., list 1. As mentioned above, the accumulated offsets for the first list, e.g., list 0, are used to determine the offsets for the second list, e.g., list 1. The determination of the offsets for the second list is shown below in the following pseudocode:

```
if(apply_weights)
{
    w0 =
wbp_weight[0][fw_ref_idx][bw_ref_idx][0];
    w1 =
wbp_weight[1][fw_ref_idx][bw_ref_idx][0];
    denom = (double)(1 <<
(luma_log_weight_denom + 1));
    round = 2.0 * wp_luma_round * (1 -
        img ->bipred_rounding);
}
else
{
    w0 = 1.0;
    w1 = 1.0;
    denom = 2.0;
    round = 1.0 - img->bipred_rounding;
}
tmp = valOrg - clip1a((int)(((w0 * (predF + offsetF)) +
(w1 * predB) + round) / denom));
AccFrameOffsetB[bw_ref_idx] += (denom / w1) * tmp;
``` where "tmp" is the prediction error, "offsetF" is the optimized offset that was determined for the first list, "predF" is the prediction from the first list, "predB" is the prediction from the second list, "w0" is a weighting factor, e.g., a first weight, for the first list, "w1" is a weighting factor, e.g., a second weight, for the second list, and AccFrameOffsetB[bw_ref_idx] is the accumulated error. By applying weights to at least one of the first offset value and the second offset value, this procedure takes into account the weights of the predictions, if any, and the rounding used in the B-slice. At this point, there are two offsets, determined jointly, for each integer and sub-integer location: a first offset ("offsetF"), e.g., a forward offset, and a second offset ("offsetB"), e.g, a backward offset, that is calculated using the first offset. In this manner, for each integer position having fifteen sub-pel positions, thirty-two offsets are calculated.

Next, for a given pixel being predicted, the prediction error ("tmp") that is used in calculating the final offset value for a given pixel position is determined by combining the prediction from the first list ("predF"), e.g., forward prediction, the first offset ("offsetF"), e.g., forward offset, the prediction from the second list ("predB"), e.g., backward prediction, and the second offset ("offsetB"), e.g., backward offset, and then dividing the result to produce a prediction error, as illustrated by the following pseudocode:

```
if(apply_weights)
{
    w0 =
wbp_weight[0][fw_ref_idx][bw_ref_idx][0];
    w1 =
wbp_weight[1][fw_ref_idx][bw_ref_idx][0];
    denom = (double)(1 <<
(luma_log_weight_denom + 1));
    round = 2.0 * wp_luma_round * (1 -
        img->bipred_rounding);
}
else
{
    w0 = 1.0;
    w1 = 1.0;
    denom = 2.0;
    round = 1.0 - img->bipred_rounding;
}
tmp = valOrg - clip1a((int)(((w0 * (predF + offsetF))
    + (w1 * (predB + offsetB)) + round) /
denom));
    AccFrameOffsetB[bw_ref_idx] += (denom / w1) * tmp;
    AccFrameOffsetBCount[bw_ref_idx] += 1;
``` where "tmp" is the prediction error, "offsetF" is the optimized offset that was determined for the first list, "predF" is the prediction from the first list, "offsetB" is the optimized offset that was determined for the second list, "predB" is the prediction from the second list, "w0" is a first weight, "w1" is a second weight, "denom" is a normalization term, "AccFrameOffsetB[bw_ref_idx]" is the accumulated prediction error for each integer or sub-integer pixel position, and "AccFrameOffsetBCount[bw_ref_idx]" is a counter that is incremented each time a new contribution to the error is accumulated. It should also be noted that the "if" routine in the above pseudocode may be part of a loop that iterates through all macroblocks, while the computation of the final offset value, described below, may happen after the loop. In addition, counter "AccFrameOffsetBCount[bw_ref_idx]" may be initialized to zero, for example, before the loop. As seen above, in the most straightforward case, the prediction error "tmp" is determined by combining, in addition to other terms, the prediction from the first list ("predF"), e.g., forward prediction, and the first offset ("offsetF"), e.g., forward offset, to produce a first offset predictive sum, along with the prediction from the second list ("predB"), e.g., backward prediction, and the second offset ("offsetB"), e.g., backward offset, to produce a second offset predictive sum. The first offset predictive sum may be multiplied by a first weight, e.g., w0, and the second offset predictive sum may be multiplied by a second weight, e,g, w1. The first weighted offset predictive sum and the second weighted offset predictive sum may be added together to produce a final weighted offset predictive sum. This final weighted offset predictive sum may then be divided by two, or a normalization term, e.g., denom. However, the denominator ("denom") need not be equal to two and may instead be another normalization term.

After the prediction error has been accumulated in "AccFrameOffsetB[bw_ref_idx]" for a given pixel position, the final offset value for that pixel position is then calculated, as shown below in pseudocode:

```
Offset[bw_ref_idx] =
  round(AccFrameOffsetB[bw_ref_idx] /
  AccFrameOffsetBCount[bw_ref_idx]);
```

As seen above, the final offset value, Offset[bw_ref_idx], is calculated by dividing the prediction error accumulated in AccFrameOffsetB[bw_ref_idx] by the number of contributions to the error, AccFrameOffsetBCount[bw_ref_idx] to produce a final offset value for each sub-integer pixel position. This process essentially computes the average error per pixel position in that all error is accumulated, and the accumulated error is divided by the number of contributions to the error. It should be noted that the number of contributions may not be the same for all pixel positions because the number of contributions depends on the pixel positions that the motion vectors are pointing to. After a final offset value ("Offset[bw_ref_idx]") is calculated for each integer and sub-integer location associated with the different reference frames, this block of final offset values may be encoded in a bitstream that is transmitted to the decoder. For example, a block of 16 final offset values may be encoded for "P" frames and a block of 32 final offset values may be encoded for bipredicted frames.

The frame DC offset is calculated in a similar manner, except for the fact that the prediction error combines contributions from all sub-pixel positions. The frame DC offset is an offset that may be applied to all pixels in the frame, independent of whether the pixel is an integer position or is interpolated. Frame DC offsets are used to compensate for the offset of reference frames having index greater than zero, i.e., not the reference frames closest to the frame being encoded.

Furthermore, when video blocks of a coded unit use multiple different reference frames, e.g., for bi-directional prediction, different DC offsets may be calculated and sent for each integer and sub-integer location associated with the different reference frames. In some cases, some reference frames may comprise a single frame-based DC offset, while other reference frames may have several location-specific DC offsets. Some schemes may use location-specific DC offsets only with respect to the reference frame that is closest in temporal distance to the current frame being coded, and may use a single frame-based DC offset for all of the other reference frames.

In order to code the DC offsets, 1 bit per frame may be used to indicate whether a single frame-based DC offset is used or whether several location-specific DC offsets are used. If the DC offsets have only integer precision, the values of these offsets may be coded using signed exponential-Golomb code. If the DC offsets have fractional precision, the values of the integer offset may be coded using a signed exponential-Golomb code, and the values of non-integer offsets may be coded using residual differences relative to the integer offset defined by the signed exponential-Golomb code.

For example, coding of the offsets may be done by first coding an integer offset and then coding each fractional offset. In this case, the integer offset and the fractional offsets are coded differently. The integer offset may be coded using signed exponential-Golomb code. Depending on the magnitude of the integer offset, the fractional offsets may be quantized differently than the integer offset. For example, coarser levels of quantization may be applied on the fractional offsets when an integer offset has a large magnitude. After quantization, the fractional offsets may be coded using fixed length codes.

The video encoder may include a quantization unit (e.g., unit 40 of video encoder 50) that for each of the offset values assigns a first number of bits to an integer portion a given offset value and assigns a second number of bits to a fractional portion of the given offset value, wherein the first and second numbers of bits are determined based on a magnitude of the integer portion. In any case, video encoder 50 may encode the first number of bits differently than the second number of bits.

As noted above, the DC offset values may be coded as part of the bitstream for each coded unit. Therefore, on the decoder side, the decoder may simply apply the appropriate DC offset values to the pixels of any generated predictive video blocks. The DC offset value used by the decoder may be defined in a syntax element for the specific integer or sub-integer pixel location associated with each predictive video block. For example, a syntax element in a header of a coded unit may include flags or values to specify each of the plurality of offset values for that coded unit. The terms "offset" and "DC offset" are used interchangeably in this disclosure. The offset is referred to as DC offset insofar as an overall offset is defined for each same respective pixel location, e.g., one offset for the integer location and several different offsets for each possible sub-pixel location.

Figure 5:
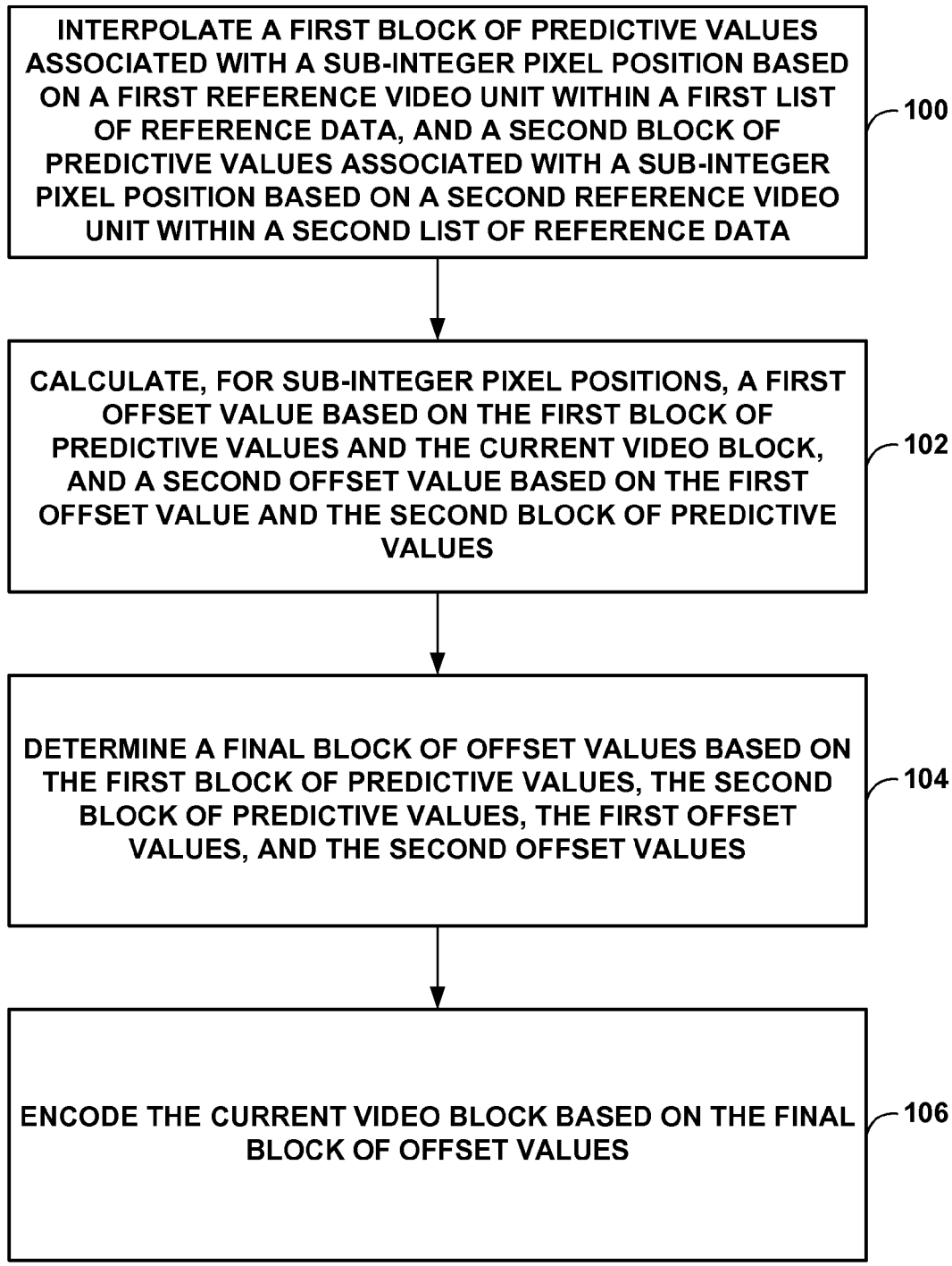
FIG. 5 is a flowchart illustrating an example method of encoding a video block by a video encoder consistent with this disclosure.

FIG. 5 is a flowchart illustrating an example method of encoding a video block by a video encoder in accordance with this disclosure. Initially, prediction unit 32 of video encoder 22 interpolates two blocks of predictive values: a first block of predictive values associated with a sub-integer pixel position based on a first reference video unit within a first list of reference data, e.g., list 0, and a second block of predictive values associated with the sub-integer pixel position based on a second reference video unit within a second list of reference data, e.g., list 1 (100). In some examples, interpolating the first value and the second value is performed by fixed interpolation filters. In another example, the first offset values and the second offset values include one offset value for integer pixel locations and several offset values for different sub-integer pixel locations. In some examples, the first offset values and the second offset values include fifteen different offset values for fifteen different sub-integer pixel locations.

After the first and second blocks of predictive values have been interpolated, motion compensation unit 37 calculates, for sub-integer pixel positions, a first offset value based on the first block of predictive values and the current video block, and a second offset value based on the first offset value and the second block of predictive values (102).

Once the first and second offset values have been calculated, prediction unit 32 determines a final block of offset values based on the first block of predictive values, the second block of predictive values, the first offset values, and the second offset values (104). In some examples, determining a final block of offset values based on the first offset value and the second offset value includes applying weights to at least one or both of the first offset value and the second offset value.

In another example, determining a final block of offset values includes adding together the first block of predictive values, the second block of predictive values, the first offset values, and the second offset values to produce an offset predictive sum, dividing the offset predictive sum by two to produce a prediction error, accumulating the prediction error for each sub-integer pixel position, and dividing the accumulated prediction error for each sub-integer pixel position by a number of contributions to the prediction error to produce a final offset value for each sub-integer pixel position.

In some examples, determining a final block of offset values includes adding the first block of predictive values and the first offset values to produce a first offset predictive sum, adding the second block of predictive values and the second offset values to produce a second offset predictive sum, multiplying the first offset predictive sum by a first weight to produce a first weighted offset predictive sum, and the second offset predictive sum by a second weight to produce a second weighted offset predictive sum, adding the first weighted offset predictive sum and the second weighted offset predictive sum to produce a final weighted offset predictive sum, and dividing the final weighted offset predictive sum by a normalization term to produce a prediction error, accumulating the prediction error for each sub-integer pixel position, and dividing the accumulated prediction error for each sub-integer pixel position by a number of contributions to the prediction error to produce a final offset value for each sub-integer pixel position.

After determining the final block of offset values, video encoder 22 encodes the current video block based on the final block of offset values (106). In some examples, video encoder 22 encodes the first offset values and the second offset values as part of a coded bitstream that may include the coded current video block. In one example, encoding the first offset values and the second offset values includes, for each of the first offset values and the second offset values, i.e., the final offset values for a given integer or sub-integer pixel location, assigning a first number of bits to an integer portion of an offset value of the final block of offset values and assigning a second number of bits to a fractional portion of the offset value of the final block of offset values, wherein the first and second numbers of bits are determined based on a magnitude of the integer portion. In another example, the method further includes transmitting the coded bitstream from source device 12 to destination device 16.

In some examples, the final block of offset values may include one offset value for integer pixel locations and several offset values for different sub-integer pixel locations. In another example, the final block of offset values may include fifteen different offset values for fifteen different sub-integer pixel locations.

Techniques of this disclosure are also directed to determining the configuration of filters and offsets in order to achieve a desirable rate-distortion for a B-slice. The pseudocode presented immediately below outlines the configurations of filters and offsets used by video encoder 22 in order to find the combination that obtains the best rate-distortion characteristics for a B-slice:

```
a.   Pass 1: Encode frame by using sequence filters,
     zero sub-pixel and zero frame offsets;
b.   If the reference frames with idx=0 have the same
     distance from the current frame;
         POC Pass: Encode frame by using sequence
     filters, zero sub-pixel and zero frame offsets on the POC
     weighted reference frames;
         Compare results of Pass 1 and POC Pass;
         If POC Pass is better
             From now on use POC weighted reference
         frames;
             Best = result of POC Pass;
         Otherwise
             Best = result of Pass 1;
     Otherwise
         Best = result of Pass 1;
c.   Compute frame filters, sub-pixel and frame offsets
     on the current frame;
d.   Pass 2: Encode frame by using frame filters, sub-
     pixel and frame offsets;
e.   If Pass 2 encoding is better than Best
         Best = result of Pass 2 encoding;
         Pass 3: Increase quantization step by 1 and encode
     frame by using frame filters, sub-pixel and frame
     offsets;
     Otherwise
         Pass 3: Increase quantization step by 1 and encode
     frame by using sequence filters, zero sub-pixel and zero
     frame offsets;
f.   If Pass 3 encoding is better than Best
         Add to the bitstream the Pass 3 encoding;
     Otherwise
         Add to the bitstream the encoding in Best;
g.   Compute sequence filters (to encode the next
     frame).
```

Figure 6A:
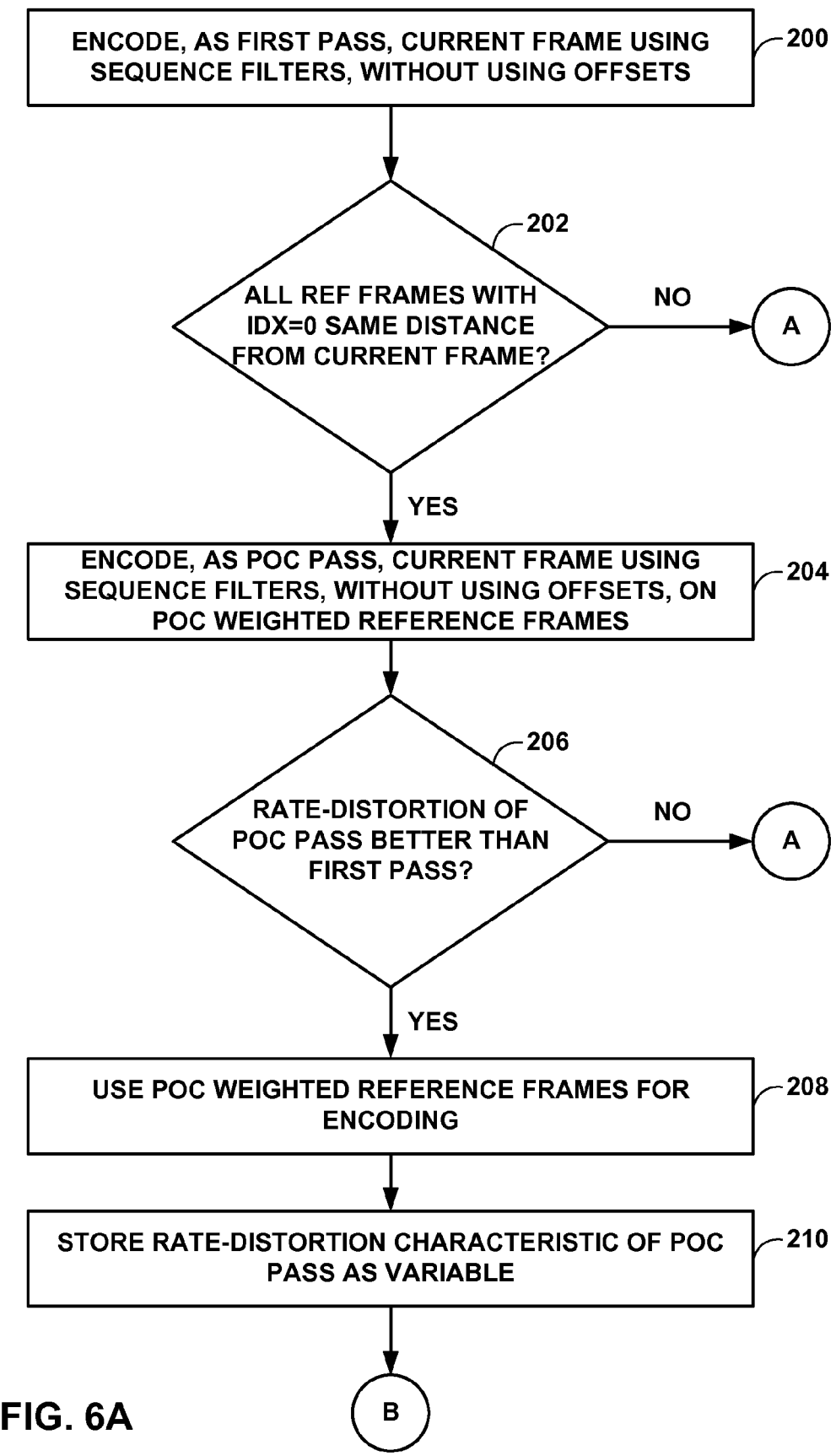
FIGS. 6A-6C is a flowchart illustrating a method of optimizing the configuration of filters and offsets in order to achieve an optimal rate-distortion for a B-slice consistent with this disclosure.
Figure 6B:
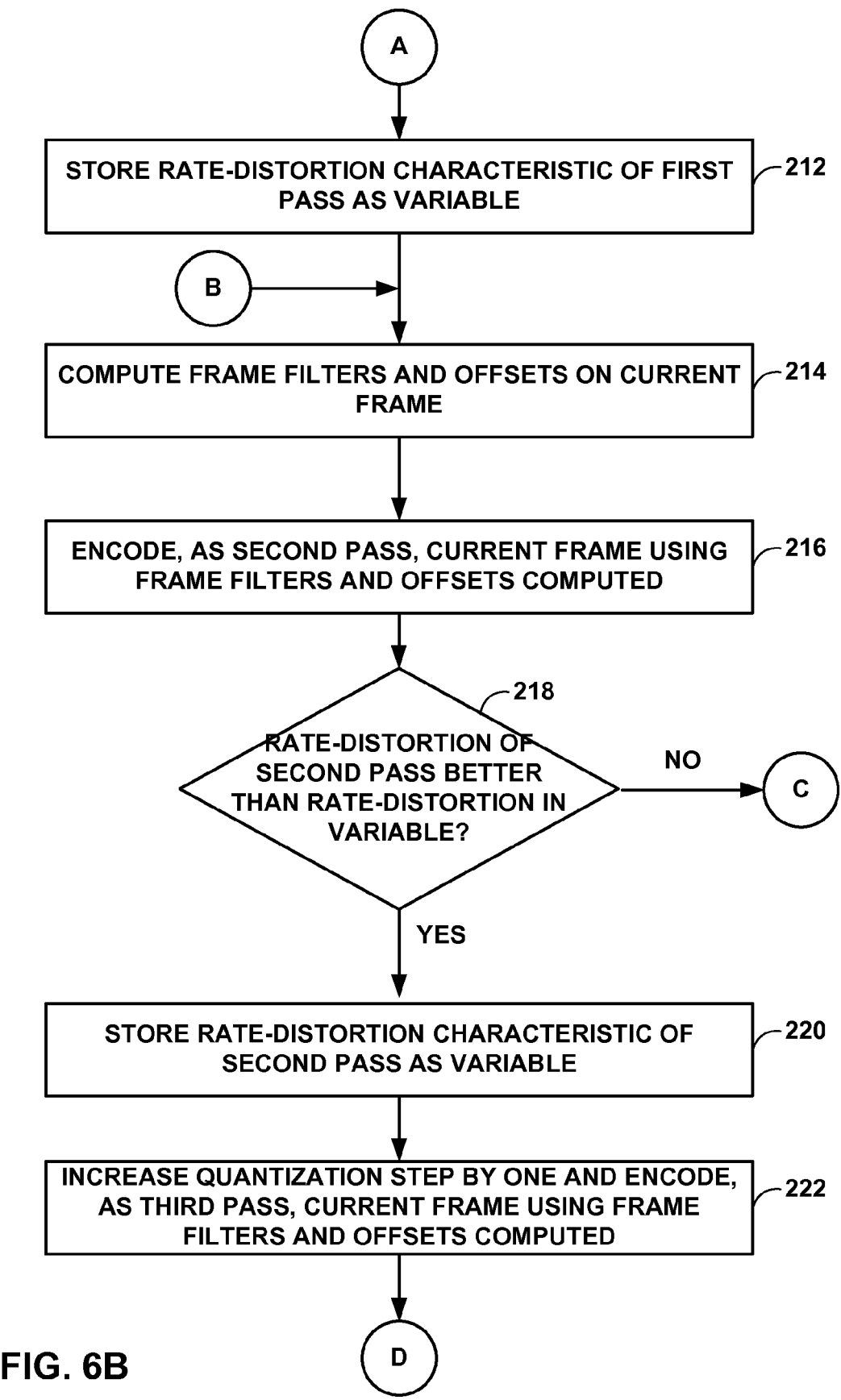
Figure 6C:
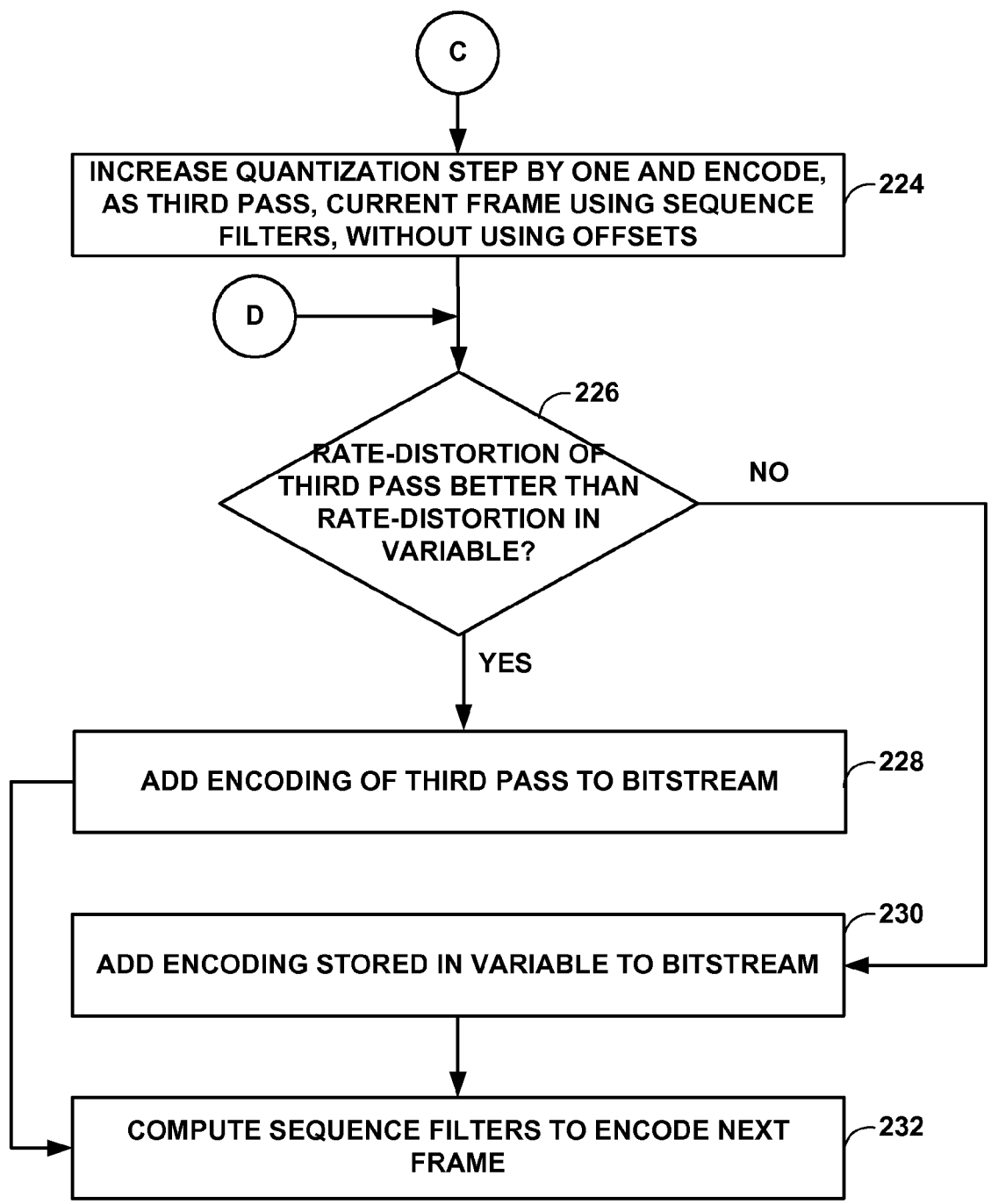

FIGS. 6A-6C is a flowchart illustrating an example method of determining the configuration of filters and offsets in order to achieve a desirable rate-distortion for a B-slice, based on the pseudocode presented immediately above. The pseudocode and FIGS. 6A-6C will be described together. It should be noted that the steps in the pseudocode presented above are enumerated for purposes of clarity. Different steps may be further divided into additional steps, and multiple steps may be combined. As seen above in step a of the pseudocode, the frame is encoded using sequence filters, but not offsets (200). Unlike frame filters, which are computed in order to be optimized with respect to the frame being encoded, sequence filters are computed by using a subset of past frames. Frame filters can only be computed after one coding pass, because motion vectors are necessary for their computation. Sequence filters, however, can be applied to the first coding pass, because they are computed using past frames. Sequence filters are computed on past frames, i.e., frames that have already been encoded. In a manner similar to the one described for a frame filter, the squared error is accumulated in an array variable independently for each subpixel position. However, prior to adding the contribution of the most recently encoded frame, the content of the array variable may be scaled down. Scaling down the contribution of older frames allows the encoder to "forget" the past by weighting more heavily the contributions that are more recent. For example, the content of the array variable may be divided by a scaling factor of two, although other scaling factors may be used to increase or decrease the "memory" of the system. In step b, if all reference frames with id ("idx")=0 have the same distance from the current frame ("YES" decision at 202), i.e., the same number of frames separate a reference frame from the current frame, then video encoder 22 performs a Picture Order Content (POC) Pass. From the POC Pass, it is possible to infer whether the forward and the backward reference frames have a different distance from the frame being encoded. It is then possible to weight the contribution in a manner inversely proportional to the distance. In the weighted prediction these weights are referred to as "implicit." For example, when coding the sequence of frames P1 B1 B2 P2 B3 B4 P3, the bi-predicted frame B2 is closer to the reference frame P2 than to the reference P1, so the contribution of P2 can be weighted 2/3 and the contribution of P1 can be weighted 1/3. The current frame is encoded in the POC Pass using sequence filters, without offsets, on POC weighted reference frames (204).

Continuing with step b, the rate distortion cost value results of Pass 1 and the POC pass are then compared, and if POC Pass provides a lower rate-distortion value ("YES" decision at 206), POC weighted reference frames are used (208) and the variable "Best" is set to the result of POC Pass (210). If, however, the results of Pass 1 define a lower rate distortion cost value than the results of POC Pass ("NO" decision at 206), then the variable "Best" is set to the result of Pass 1 (212). If, however, at the beginning of step b, the reference frames with id ("idx")=0 do not have the same distance from the current frame ("NO" decision in 202), the variable "Best" is set to the result of Pass 1 (212).

Referring now to step c, video encoder 22 calculates frame filters and the sub-pixel and frame offsets for the current frame (214). In step d, a second pass, or Pass 2, is performed, in which video encoder 22 encodes the current frame using the frame filters and the sub-pixel and frame offsets calculated in step c (216).

In step e, if the encoding from Pass 2 results in a lower rate-distortion value than the value currently in variable "Best" ("YES" decision at 218), then the variable "Best" is set to the result of the Pass 2 encoding (220). Pass 3 is then performed such that the quantization step is increased by 1, and video encoder 22 encodes the frame using frame filters, sub-pixel and frame offsets (222). If, however, the encoding from Pass 2 does not define a lower rate-distortion value than the value currently in variable "Best" ("NO" decision at 218), then Pass 3 is performed such that the quantization step is increased by 1, and video encoder 22 encodes the frame using sequence filters, without using sub-pixel and frame offsets (224).

After Pass 3 is performed, in step f, the result of the Pass 3 encoding is compared to the result stored in the variable "Best." If the encoding used in Pass 3 resulted in a lower rate-distortion value, then the value stored in "Best" ("YES" decision at 226), then the filter and offset configurations used in Pass 3 are added to the bitstream (228). If the encoding used in Pass 3 did not result in a lower rate-distortion value then the value stored in "Best" ("NO" decision at 226), the filter and offset configurations that were used to produce the result stored in variable "Best" are added to the bitstream (230). Finally, at step g, sequence filters are computed in order to encode the next frame (232). Thus, in the manner described above, video encoder 22 is able to choose a filter and offset combination with results in the best rate-distortion for a B-slice.

Similarly, techniques of this disclosure are also directed to determining the configuration of filters and offsets in order to achieve a desirable rate-distortion for a P-slice. The pseudocode presented immediately below outlines the configurations of filters and offsets used by video encoder 22 in order to find the combination that obtains the best rate-distortion characteristics for a P-slice:

| | |
|---|---|
| a. | Compute sub-pixel and frame offsets for the first pass; |
| b. | Pass 1: Encode frame by using sequence filters, sub-pixel and frame offsets for the first pass; |
| c. | Compute frame filters, sub-pixel and frame offsets on the current frame; |
| d. | Pass 2: Encode frame by using frame filters, sub-pixel and frame offsets; |
| e. | Compare results of Pass 1 and Pass 2; |
| f. | Add to the bitstream the encoding of the best one; |
| g. | Compute sequence filters (to encode the next frame). |

It should be noted that the steps in the pseudocode presented above are enumerated for purposes of clarity. Different steps may be further divided into additional steps, and multiple steps may be combined. As seen above in step a of the pseudocode, sub-pixel and frame offsets are computed for the first pass. In step b, in the first pass, the frame is encoded using sequence filters, sub-pixel and frame offsets. Then, frame filters and sub-pixel and frame offsets are computed on the current frame in step c.

In step d, a second pass, or Pass 2, is performed, in which video encoder 22 encodes the frame using frame filters and sub-pixel and frame offsets. The results of Pass 1 and Pass 2 are compared in step e. In step f, if the encoding used in Pass 1 resulted in lower rate-distortion values, then the filter and offset configurations used in Pass 1 are added to the bitstream. However, if the encoding used in Pass 2 resulted in lower rate-distortion values, then the filter and offset configurations used in Pass 2 are added to the bitstream. Finally, at step g, sequence filters are computed in order to encode the next frame. Thus, in the manner described above, video encoder 22 is able to choose a filter and offset combination with results in the best rate-distortion for a P-slice.

The techniques of this disclosure may be realized in a wide variety of devices or apparatuses, including a wireless handset, an integrated circuit (IC) or a set of ICs (i.e., a chip set). Any components, modules or units have been described provided to emphasize functional aspects and does not necessarily require realization by different hardware units.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various examples have been described. These and other examples are within the scope of the following claims.

The invention claimed is:

1. A video encoding method for encoding a current video block, the method comprising:
    interpolating, via an encoder, a first block of predictive values associated with a sub-integer pixel position based on a first reference video unit within a first list of reference data, and a second block of predictive values associated with the sub-integer pixel position based on a second reference video unit within a second list of reference data;
    calculating, via an encoder, for sub-integer pixel positions, first offset values based on the first block of predictive values and the current video block, and second offset values based on the first offset values and the second block of predictive values wherein the first offset values are DC values applied to the first block of predictive values, and wherein the second offset values are DC values applied to the second block of predictive values;
    determining, via an encoder, a final block of offset values based on the first block of predictive values, the second block of predictive values, the first offset values, and the second offset values; and
    encoding, via an encoder, the current video block based on the final block of offset values, wherein the final block of offset values comprise DC values applied to predictive data.

2. The method of claim 1, wherein interpolating the first block of predictive values and the second block of predictive values is performed by fixed interpolation filters.

3. The method of claim 1, wherein determining a final block of offset values comprises:
    applying weights to at least one of the first offset values and the second offset values.

4. The method of claim 1, wherein determining a final block of offset values comprises:
    adding together the first block of predictive values, the second block of predictive values, the first offset values, and the second offset values to produce an offset predictive sum;
    dividing the offset predictive sum by two to produce a prediction error;
    accumulating the prediction error for each sub-integer pixel position; and
    dividing the accumulated prediction error for each sub-integer pixel position by a number of contributions to the prediction error to produce a final offset value for each sub-integer pixel position.

5. The method of claim 1, wherein determining a final block of offset values comprises:
    adding the first block of predictive values and the first offset values to produce a first offset predictive sum;
    adding the second block of predictive values and the second offset values to produce a second offset predictive sum;
    multiplying the first offset predictive sum by a first weight to produce a first weighted offset predictive sum, and the second offset predictive sum by a second weight to produce a second weighted offset predictive sum;
    adding the first weighted offset predictive sum and the second weighted offset predictive sum to produce a final weighted offset predictive sum;
    dividing the final weighted offset predictive sum by a normalization term to produce a prediction error;
    accumulating the prediction error for each sub-integer pixel position; and dividing the accumulated prediction error for each sub-integer pixel position by a number of contributions to the prediction error to produce a final offset value for each sub-integer pixel position.

6. The method of claim 1, further comprising encoding the final block of offset values as part of a coded bitstream that includes the coded current video block.

7. The method of claim 6, further comprising transmitting the coded bitstream from a source device to a destination device.

8. The method of claim 6, wherein encoding the final block of offset values comprises assigning a first number of bits to an integer portion of an offset value of the final block of offset values and assigning a second number of bits to a fractional portion of the offset value of the final block of offset values, and wherein the first and second numbers of bits are determined based on a magnitude of the integer portion.

9. The method of claim 6, wherein the final block of offset values includes one offset value for integer pixel locations and several offset values for different sub-integer pixel locations.

10. The method of claim 9, wherein the final block of offset values includes fifteen different offset values for fifteen different sub-integer pixel locations.

11. An apparatus that encodes video data, the apparatus comprising a video encoder that:
    interpolates a first block of predictive values associated with a sub-integer pixel position based on a first reference video unit within a first list of reference data, and a second block of predictive values associated with the sub-integer pixel position based on a second reference video unit within a second list of reference data;
    calculates, for sub-integer pixel positions, first offset values based on the first block of predictive values and the current video block, and second offset values based on the first offset values and the second block of predictive values, wherein the first offset values are DC values applied to the first block of predictive values, and wherein the second offset values are DC values applied to the second block of predictive values:

determines a final block of offset values based on the first block of predictive values, the second block of predictive values, the first offset values, and the second offset values; and encodes the current video block based on the final block of offset values, wherein the final block of offset values comprise DC values applied to predictive data.

12. The apparatus of claim 11, wherein the video encoder comprises at least one fixed interpolation filter that interpolates the first block of predictive values and the second block of predictive values.

13. The apparatus of claim 11, wherein, in order to determine the final block of offset values, the video encoder applies weights to at least one of the first offset values and the second offset values.

14. The apparatus of claim 11, wherein, in order to determine the final block of offset values, the video encoder adds together the first block of predictive values, the second block of predictive values, the first offset values, and the second offset values to produce an offset predictive sum, divides the offset predictive sum by two to produce a prediction error, accumulates the prediction error for each sub-integer pixel position, and divides the accumulated prediction error for each sub-integer pixel position by a number of contributions to the prediction error to produce a final offset value for each sub-integer pixel position.

15. The apparatus of claim 11, wherein, in order to determine the final block of offset values, the video encoder:

adds the first block of predictive values and the first offset values to produce a first offset predictive sum, adds the second block of predictive values and the second offset values to produce a second offset predictive sum, multiplies the first offset predictive sum by a first weight to produce a first weighted offset predictive sum, and the second offset predictive sum by a second weight to produce a second weighted offset predictive sum;

adds the first weighted offset predictive sum and the second weighted offset predictive sum to produce a final weighted offset predictive sum;

divides the final weighted offset predictive sum by a normalization term to produce a prediction error;

accumulates the prediction error for each sub-integer pixel position; and divides the accumulated prediction error for each sub-integer pixel position by a number of contributions to the prediction error to produce a final offset value for each sub-integer pixel position.

16. The apparatus of claim 11, wherein the video encoder encodes the final block of offset values as part of a coded bitstream that includes the coded current video block.

17. The apparatus of claim 16, wherein the video encoder assigns a first number of bits to an integer portion of an offset value of the final block of offset values and assigns a second number of bits to a fractional portion of an offset value of the final block of offset values, and wherein the first and second numbers of bits are determined based on a magnitude of the integer portion.

18. The apparatus of claim 16, wherein the final block of offset values includes one offset value for integer pixel locations and several offset values for different sub-integer pixel locations.

19. The apparatus of claim 18, wherein the final block of offset values includes fifteen different offset values for fifteen different sub-integer pixel locations.

20. The apparatus of claim 11, wherein the video encoder forms part of a wireless communication device.

21. The apparatus of claim 11, wherein the video encoder comprises an integrated circuit device.

22. A non-transitory computer-readable storage medium comprising instructions encoded on the computer-readable medium that, upon execution, cause a processor within a video encoder to:

interpolate a first block of predictive values associated with a sub-integer pixel position based on a first reference video unit within a first list of reference data, and a second block of predictive values associated with the sub-integer pixel position based on a second reference video unit within a second list of reference data;

calculate, for sub-integer pixel positions, first offset values based on the first block of predictive values and the current video block, and second offset values based on the first offset values and the second block of predictive values, wherein the first offset values are DC values applied to the first block of predictive values, and wherein the second offset values are DC values applied to the second block of predictive values:

determine a final block of offset values based on the first block of predictive values, the second block of predictive values, the first offset values, and the second offset values; and encode the current video block based on the final block of offset values, wherein the final block of offset values comprise DC values applied to predictive data.

23. The non-transitory computer-readable storage medium of claim 22, wherein the instructions that cause the processor to interpolate the first block of predictive values and the second block of predictive values comprises instructions to cause the processor to select a set of interpolation filters from a set of fixed interpolation filters.

24. The non-transitory computer-readable storage medium of claim 22, wherein the instructions that cause a processor to determine a final block of offset values comprise instructions that cause a processor to apply weights to at least one of the first offset values and the second offset values.

25. The non-transitory computer-readable storage medium of claim 22, wherein the instructions that cause a processor to determine a final block of offset values comprise instructions that cause a processor to:

add together the first block of predictive values, the second block of predictive values, the first offset values, and the second offset values to produce an offset predictive sum; and divide the offset predictive sum by two to produce a prediction error;

accumulate the prediction error for each sub-integer pixel position; and divide the accumulated prediction error for each sub-integer pixel position by a number of contributions to the prediction error to produce a final offset value for each sub-integer pixel position.

26. The non-transitory computer-readable storage medium of claim 22, wherein the instructions that cause a processor to determine a final block of offset values comprise instructions that cause a processor to:

add the first block of predictive values and the first offset values to produce a first offset predictive sum;

add the second block of predictive values and the second offset values to produce a second offset predictive sum;

multiply the first offset predictive sum by a first weight to produce a first weighted offset predictive sum, and the second offset predictive sum by a second weight to produce a second weighted offset predictive sum;

add the first weighted offset predictive sum and the second weighted offset predictive sum to produce a final weighted offset predictive sum;

divide the final weighted offset predictive sum by a normalization term to produce a prediction error;

accumulate the prediction error for each sub-integer pixel position; and divide the accumulated prediction error for each sub-integer pixel position by a number of contributions to the prediction error to produce a final offset value for each sub-integer pixel position.

27. The non-transitory computer-readable storage medium of claim 22, wherein the instructions that cause a processor to determine a final block of offset values comprise instructions that cause a processor to:

encode the final block of offset values as part of a coded bitstream that includes the coded current video block.

28. The non-transitory computer-readable storage medium of claim 27, further comprising instructions that cause transmission of the coded bitstream from a source device to a destination device.

29. The non-transitory computer-readable storage medium of claim 27, wherein the instructions that cause a processor to encode the final block of offset values comprise instructions that cause a processor to: assign a first number of bits to an integer portion of an offset value of the final block of offset values and assign a second number of bits to a fractional portion of the offset value of the final block of offset values, wherein the first and second numbers of bits are determined based on a magnitude of the integer portion.

30. The non-transitory computer-readable storage medium of claim 27, wherein the final block of offset values includes one offset value for integer pixel locations and several offset values for different sub-integer pixel locations.

31. The non-transitory computer-readable storage medium of claim 30, wherein the final offset values includes fifteen different offset values for fifteen different sub-integer pixel locations.

32. An apparatus that encodes video data, the apparatus comprising:

means for interpolating a first block of predictive values associated with a sub-integer pixel position based on a first reference video unit within a first list of reference data, and a second block of predictive values associated with the sub-integer pixel position based on a second reference video unit within a second list of reference data;

means for calculating, for sub-integer pixel positions, first offset values based on the first block of predictive values and the current video block, and second offset values based on the first offset values and the second block of predictive values, wherein the first offset values are DC values applied to the first block of predictive values, and wherein the second offset values are DC values applied to the second block of predictive values;

means for determining a final block of offset values based on the first block of predictive values, the second block of predictive values, the first offset values, and the second offset values; and means for encoding the current video block based on the final block of offset values: wherein the final block of offset values comprise DC values applied to predictive data.

33. The apparatus of claim 32, wherein the means for interpolating the first block of predictive values and the second block of predictive values is performed by fixed interpolation filters.

34. The apparatus of claim 32, wherein the means for determining a final block of offset values comprises:

means for applying weights to at least one of the first offset values and the second offset values.

35. The apparatus of claim 32, wherein the means for determining a final block of offset values comprises:

means for adding together the first block of predictive values, the second block of predictive values, the first offset values, and the second offset values to produce an offset predictive sum;

means for dividing the offset predictive sum by two to produce a prediction error;

means for accumulating the prediction error for each sub-integer pixel position; and means for dividing the accumulated prediction error for each sub-integer pixel position by a number of contributions to the prediction error to produce a final offset value for each sub-integer pixel position.

36. The apparatus of claim 32, wherein the means for determining a final block of offset values comprises:

means for adding the first block of predictive values and the first offset values to produce a first offset predictive sum;

means for adding the second block of predictive values and the second offset values to produce a second offset predictive sum;

means for multiplying the first offset predictive sum by a first weight to produce a first weighted offset predictive sum, and the second offset predictive sum by a second weight to produce a second weighted offset predictive sum;

means for adding the first weighted offset predictive sum and the second weighted offset predictive sum to produce a final weighted offset predictive sum;

means for dividing the final weighted offset predictive sum by a normalization term to produce a prediction error;

means for accumulating the prediction error for each sub-integer pixel position; and means for dividing the accumulated prediction error for each sub-integer pixel position by a number of contributions to the prediction error to produce a final offset value for each sub-integer pixel position.

37. The apparatus of claim 32, further comprising means for encoding the final block of offset values as part of a coded bitstream that includes the coded current video block.

38. The apparatus of claim 37, further comprising means for transmitting the coded bitstream from a source device to a destination device.

39. The apparatus of claim 37, wherein the means for encoding the final block of offset values comprises means for assigning a first number of bits to an integer portion of an offset value of the final block of offset values and assigning a second number of bits to a fractional portion of the offset value of the final block of offset values, and wherein the first and second numbers of bits are determined based on a magnitude of the integer portion.

40. The apparatus of claim 37, wherein the final block of offset values includes one offset value for integer pixel locations and several offset values for different sub-integer pixel locations.

41. The apparatus of claim 40, wherein the final block of offset values includes fifteen different offset values for fifteen different sub-integer pixel locations.

42. A video encoding method comprising:

encoding, via an encoder, as a first pass, a current frame using sequence filters, without using offsets;

if all reference frames with an id=0 are separated from the current frame by the same number of frames, then:

encoding, via an encoder, as a picture order content (POC) pass, the current frame using sequence filters, without using offsets, on POC weighted reference frames;

if the rate-distortion characteristic of the POC pass defines a lower rate distortion cost value than the rate-distortion characteristic of the first pass, then:

using the POC weighted reference frames for encoding; and storing the rate-distortion characteristic of the POC pass as a variable;

if the rate-distortion characteristic of the first pass defines a lower rate distortion cost value than the rate-distortion characteristic of the POC pass, then storing the rate-distortion characteristic of the first pass as the variable;

if all reference frames with an id=0 are not separated from the current frame by the same number of frames, then storing the rate-distortion characteristic of the first pass as the variable; computing, via an encoder, frame filters and offsets on the current frame;

encoding, via an encoder, as a second pass, the current frame using the frame filters and offsets computed;

if the rate-distortion characteristic of the second pass defines a lower rate distortion cost value than the rate-distortion characteristic stored in the variable, then:

storing the rate-distortion characteristic of the second pass as the variable; and increasing a quantization step by one and encoding, as a third pass, the current frame using the frame filters and offsets computed; if the rate-distortion characteristic of the second pass does not define a lower rate distortion cost value than the rate-distortion characteristic stored in the variable, then increasing the quantization step by one and encoding, as the third pass, the current frame using the sequence filters, without using offsets;

if the rate-distortion characteristic of the third pass defines a lower rate distortion cost value than the rate-distortion characteristic stored in the variable, then adding the encoding of the third pass to the bitstream;

if the rate-distortion characteristic of the third pass does not define a lower rate distortion cost value than the rate-distortion characteristic stored in the variable, then adding the encoding of the variable to the bitstream; and computing, via an encoder, sequence filters to encode the next frame.

43. An apparatus that encodes video data, the apparatus comprising a video encoder that:

encodes, as a first pass, a current frame using sequence filters, without using offsets;

if all reference frames with an id=0 are separated from the current frame by the same number of frames, then:

encodes, as a picture order content (POC) pass, the current frame using sequence filters, without using offsets, on POC weighted reference frames;

if the rate-distortion characteristic of the POC pass defines a lower rate distortion cost value than the rate-distortion characteristic of the first pass, then:

uses the POC weighted reference frames to encode; and stores the rate-distortion characteristic of the POC pass as a variable;

if the rate-distortion characteristic of the first pass defines a lower rate distortion cost value than the rate-distortion characteristic of the POC pass, then stores the rate-distortion characteristic of the first pass as the variable;

if all reference frames with an id=0 are not separated from the current frame by the same number of frames, then stores the rate-distortion characteristic of the first pass as the variable;

computes frame filters and offsets on the current frame;

encodes, as a second pass, the current frame using the frame filters and offsets computed;

if the rate-distortion characteristic of the second pass defines a lower rate distortion cost value than the rate-distortion characteristic stored in the variable, then:

stores the rate-distortion characteristic of the second pass as the variable; and increases a quantization step by one and encodes, as a third pass, the current frame using the frame filters and offsets computed;

if the rate-distortion characteristic of the second pass does not define a lower rate distortion cost value than the rate-distortion characteristic stored in the variable, then increases the quantization step by one and encodes, as the third pass, the current frame using the sequence filters, without using offsets;

if the rate-distortion characteristic of the third pass defines a lower rate distortion cost value than the rate-distortion characteristic stored in the variable, then adds the encoding of the third pass to the bitstream;

if the rate-distortion characteristic of the third pass does not define a lower rate distortion cost value than the rate-distortion characteristic stored in the variable, then adds the encoding of the variable to the bitstream; and computes sequence filters to encode the next frame.

44. A non-transitory computer-readable storage medium comprising instructions encoded on the computer-readable medium that, upon execution, cause a processor within a video encoder to:

encode, as a first pass, a current frame using sequence filters, without using offsets;

if all reference frames with an id=0 are separated from the current frame by the same number of frames, then:

encode, as a picture order content (POC) pass, the current frame using sequence filters, without using offsets, on POC weighted reference frames;

if the rate-distortion characteristic of the POC pass defines a lower rate distortion cost value than the rate-distortion characteristic of the first pass, then:

use the POC weighted reference frames to encode; and store the rate-distortion characteristic of the POC pass as a variable;

if the rate-distortion characteristic of the first pass defines a lower rate distortion cost value than the rate-distortion characteristic of the POC pass, then store the rate-distortion characteristic of the first pass as the variable;

if all reference frames with an id=0 are not separated from the current frame by the same number of frames, then stores the rate-distortion characteristic of the first pass as the variable; compute frame filters and offsets on the current frame;

encode, as a second pass, the current frame using the frame filters and offsets computed;

if the rate-distortion characteristic of the second pass defines a lower rate distortion cost value than the rate-distortion characteristic stored in the variable, then:

store the rate-distortion characteristic of the second pass as the variable; and increase a quantization step by one and encodes, as a third pass, the current frame using the frame filters and offsets computed;

if the rate-distortion characteristic of the second pass does not define a lower rate distortion cost value than the rate-distortion characteristic stored in the variable, then increase the quantization step by one and encodes, as the third pass, the current frame using the sequence filters, without using offsets;

if the rate-distortion characteristic of the third pass defines a lower rate distortion cost value than the rate-distortion characteristic stored in the variable, then add the encoding of the third pass to the bitstream;

if the rate-distortion characteristic of the third pass does not define a lower rate distortion cost value than the rate-distortion characteristic stored in the variable, then add the encoding of the variable to the bitstream; and compute sequence filters to encode the next frame.

45. An apparatus that encodes video data, the apparatus comprising:

means for encoding, via an encoder, as a first pass, a current frame using sequence filters, without using offsets;

if all reference frames with an id=0 are separated from the current frame by the same number of frames, then:

means for encoding, via an encoder, as a picture order content (POC) pass, the current frame using sequence filters, without using offsets, on POC weighted reference frames;

if the rate-distortion characteristic of the POC pass defines a lower rate distortion cost value than the rate-distortion characteristic of the first pass, then:

means for using the POC weighted reference frames for encoding; and means for storing the rate-distortion characteristic of the POC pass as a variable;

if the rate-distortion characteristic of the first pass defines a lower rate distortion cost value than the rate-distortion characteristic of the POC pass, then means for storing the rate-distortion characteristic of the first pass as the variable;

if all reference frames with an id=0 are not separated from the current frame by the same number of frames, then means for storing the rate-distortion characteristic of the first pass as the variable;

means for computing, via an encoder, frame filters and offsets on the current frame;

means for encoding, via an encoder, as a second pass, the current frame using the frame filters and offsets computed;

if the rate-distortion characteristic of the second pass defines a lower rate distortion cost value than the rate-distortion characteristic stored in the variable, then:

means for storing the rate-distortion characteristic of the second pass as the variable; and means for increasing a quantization step by one and encoding, as a third pass, the current frame using the frame filters and offsets computed;

if the rate-distortion characteristic of the second pass does not define a lower rate distortion cost value than the rate-distortion characteristic stored in the variable, then means for increasing the quantization step by one and encoding, as the third pass, the current frame using the sequence filters, without using offsets;

if the rate-distortion characteristic of the third pass defines a lower rate distortion cost value than the rate-distortion characteristic stored in the variable, then means for adding the encoding of the third pass to the bitstream;

if the rate-distortion characteristic of the third pass does not define a lower rate distortion cost value than the rate-distortion characteristic stored in the variable, then means for adding the encoding of the variable to the bitstream; and means for computing, via an encoder, sequence filters to encode the next frame.

* * * * *